United States Patent
Shirai et al.

[19]

[11] Patent Number: 6,138,801
[45] Date of Patent: Oct. 31, 2000

[54] ELECTRICALLY OPERATED BRAKE INCLUDING TWO ELECTRIC MOTORS CONNECTED TO PLANETARY GEAR DEVICE, AND BRAKING SYSTEM INCLUDING SUCH BRAKE OR BRAKES

[75] Inventors: Kenji Shirai, Mishima; Yasunori Yoshino, Toyota; Yoshinori Takemura, Hamana-gun; Seiya Yokoyama, Toyohashi, all of Japan

[73] Assignees: Toyota Jidosha Kabushiki Kaisha, Toyota; Asmo Co., Ltd., Kosai, both of Japan

[21] Appl. No.: 09/191,050

[22] Filed: Nov. 12, 1998

[30] Foreign Application Priority Data

Nov. 14, 1997 [JP] Japan .................................. 9-313564

[51] Int. Cl.⁷ .................................................. B60T 13/74
[52] U.S. Cl. ............................................ 188/157; 188/162
[58] Field of Search ..................................... 188/157–162

[56] References Cited

U.S. PATENT DOCUMENTS

| | | | |
|---|---|---|---|
| 4,596,316 | 6/1986 | Crossman | 188/72.1 |
| 4,809,824 | 3/1989 | Fargier et al. | 188/162 |
| 5,090,518 | 2/1992 | Schenk et al. | 188/157 |

FOREIGN PATENT DOCUMENTS

| | | |
|---|---|---|
| 63-257479A | 10/1988 | Japan . |
| 63-266228A | 11/1988 | Japan . |
| 1503250 | 11/1989 | Japan . |
| 1303075A | 12/1989 | Japan . |
| 1303076A | 12/1989 | Japan . |
| 341233A | 2/1991 | Japan . |
| 89/03490 | 4/1989 | WIPO .................................. 188/162 |
| WO 9603301 | 2/1996 | WIPO . |

OTHER PUBLICATIONS

SAE Paper 980600, "Modeling and Control of an Electromechanical Disk Brake".
ATZ Automobiltechnische Zeitschrift 98(1996)6 "Advanced Brake System with Highest Flexibility".
Automotive Industries, May 1995, pp. 62–64, "Stable as She Goes".
SAE Paper 93ME115, "Electric Brake System for Passenger Vehicles—Ready for Production".
Institution of Mechanical Engineer 950762, "Intelligent Braking for Current and Future Vehicles".

*Primary Examiner*—Matthew C. Graham
*Attorney, Agent, or Firm*—Kenyon & Kenyon

[57] ABSTRACT

An electrically operated brake for braking a moving body, including two electric motors and a planetary gear device having a sun gear, at least one planetary gear and a ring gear, wherein the two electric motors are connected to two members of the planetary gear device and the third member of the planetary gear device rotates an output shaft which operates a friction member driving device to move a friction member for braking the moving body.

20 Claims, 14 Drawing Sheets

FIG. 6

OUTPUT FROM CARRIER 48

| BRAKING FORCE | | ULTRASONIC MOTORS | |
|---|---|---|---|
| | | FIRST MOTOR 20 | SECOND MOTOR 22 |
| INCREASE | SMALL | FORWARD | FORWARD |
| | LARGE | FORWARD | OFF |
| HOLD | | OFF | OFF |
| DECREASE | RAPID | REVERSE | REVERSE |
| | SLOW | REVERSE | OFF |

FIG. 8

OUTPUT FROM RING GEAR 50

| BRAKING FORCE | | ULTRASONIC MOTORS | |
|---|---|---|---|
| | | FIRST MOTOR 170 | SECOND MOTOR 172 |
| INCREASE | SMALL | REVERSE | FORWARD |
| | LARGE | REVERSE | OFF |
| HOLD | | OFF | OFF |
| DECREASE | RAPID | FORWARD | REVERSE |
| | SLOW | FORWARD | OFF |

ELECTRICALLY OPERATED BRAKE INCLUDING TWO ELECTRIC MOTORS CONNECTED TO PLANETARY GEAR DEVICE, AND BRAKING SYSTEM INCLUDING SUCH BRAKE OR BRAKES

This application is based on Japanese Patent Application No. 9-313564 filed Nov. 14, 1997, the content of which is incorporated hereinto by reference.

BACKGROUND OF THE INVENTION

1. Field of the Invention

The present invention relates to an electrically operated brake including electric motors as a drive source for braking a moving body with a friction force, and an electrically operated braking system equipped with such an electrically operated brake.

2. Discussion of the Related Art

Published International Application WO96/03301 discloses one known example of an electrically operated brake using an electric motor. This electrically operated brake comprises (a) a friction member for braking a moving body, (b) an electric motor, (c) a planetary gear device including a sun gear, planetary gears meshing with the sun gear, a carrier rotatably supporting the planetary gears, and an internal or ring gear meshing with the planetary gears, and wherein the ring gear is a stationary member while the electric motor is connected to the sun gear, (d) an output shaft connected to and rotated with the carrier, and (e) a friction member driving device connected to the output shaft, for moving the friction member by rotation of the output shaft.

In this known electrically operated brake, the drive torque of the electric motor is boosted by the planetary gear device, and the boosted drive torque is transferred to the output shaft, so that the output shaft is capable of producing a braking torque which is larger than the drive torque produced by the electric motor.

However, the known electrically operated brake suffers from a problem of difficulty in constructing the brake so as to permit the output shaft to increase its braking torque. Described in detail, the braking torque to be produced by the output shaft can be increased by increasing the drive torque of the electric motor. In this case, the electric motor should have a large capacity and tends to have an undesirably large size(large diameter, in particular). Alternatively, the braking torque of the output shaft can be increased by increasing the speed reduction ratio of the planetary gear device. In this case, the rotating speed of the output shaft tends to be undesirably low. The known brake suffers from another problem that the output shaft becomes inoperable in the event of some failure of the electric motor, leading to an unsatisfactory level of fail-safe reliability of the brake.

SUMMARY OF THE INVENTION

It is therefore an object of the present invention to at least ameliorate and preferably solve at least one of the above-indicated problems encountered in the prior art.

The above object may be achieved according to any one of the following modes of the present invention, each of which is numbered like the appended claims and depends from the other mode or modes, as needed, so as to indicate possible combinations of elements or features in preferred forms of the present invention.

(1) An electrically operated braking brake for braking a moving body with a friction force, comprising: a friction member for braking the moving body; two electric motors; a planetary gear device including a sun gear, at least one planetary gear meshing with the sun gear, a carrier rotatably supporting the at least one planetary gear, and a ring gear meshing with the at least one planetary gear, the two electric motors being connected to respective two members selected from among three members consisting of the sun gear, the carrier and the ring gear; an output shaft connected to and rotated by one of the three members other than the above-indicated two members; and a friction member driving device operable by rotation of the output shaft, to move the friction member.

In the electrically operated brake of the present invention constructed as described above, the two electric motors are used, and these two electric motors are operatively connected to the output shaft by the the planetary gear device. Described more specifically, the two electric motors are connected to two members selected from among the sun gear, ring gear and carrier of the planetary gear device, while the output shaft is connected to one of the sun gear, ring gear and carrier which is other than the above-indicated two members. The planetary gear device is operated by the two electric motors, to drive the output shaft, so that the torque of the output shaft can be comparatively easily increased, without having to increase the size of each electric motor and without suffering from reduction of the operating speed of the output shaft.

In the present electrically operated brake, the two electric motors are connected to the selected two rotary elements of the planetary gear device, so that the output shaft can be driven as long as at least one of the two electric motors is normally operable. Thus, the present brake has an improved level of fail-safe reliability regarding the failure or defect of the electric motors.

The "moving body" to be braked by the present electrically operated brake may be any vehicle such as an automotive vehicle, a motor bicycle, and an airplane, which is moved on a stationary surface such as a roadway, rails, or a runway. The moving body may be any other body which is moved along a curved, straight or any other path, on a stationary surface of equipment, such as a guiding surface or a railway on a machine tool.

The present electrically operated brake may be provided either on the moving body or on the side of the stationary surface.

(2) An electrically operated brake according to the above mode (1), wherein both of the two electric motors are ultrasonic motors.

A ultrasonic motor is characterized in that its detect torque is larger than its maximum drive torque. In the electrically operated brake according to the above mode (2), therefore, the output shaft may be given a large braking torque by holding at least one of the two ultrasonic motors.

The ultrasonic motor is also characterized in that it can be relatively easily constructed to have a comparatively small axial dimension. Thus, the use of the two ultrasonic motors does not cause a significant increase in the size of the electrically operated brake. In other words, the required size of the brake including the two ultrasonic motors can be easily minimized.

(3) An electrically operated brake according to the above mode (1) or (2), wherein the two electric motors and the planetary gear device are disposed coaxially with the output shaft.

(4) An electrically operated brake according to the above mode (3), wherein the planetary gear device is disposed between the two electric motors.

(5) An electrically operated brake according to any one of the above modes (1)–(4), wherein the two electric motors are connected to the sun gear and the ring gear, respectively, while the output shaft is connected to the carrier.

In the electrically operated brake according to the above mode (5) of the invention, the torque of the output shaft can be easily increased.

(6) An electrically operated brake according to any one of the above modes (1)–(4), wherein the two electric motors are connected to the sun gear and the carrier, respectively, while the output shaft is connected to the ring gear.

In the electrically operated brake according to the above mode (6), the operating speed of the output shaft connected to the ring gear can be easily increased or reduced, by selectively operating one of the two electric motors while holding the other electric motor in the OFF or locked state. That is, the operating speed of the output shaft is reduced by operating the electric motor which is connected to the sun gear while locking the other electric motor connected to the carrier, and is increased by operating the electric motor connected to the carrier while locking the electric motor connected to the sun gear.

(7) An electrically operated brake according to any one of the above modes (1)–(4), wherein the two electric motors are connected to the ring gear and the carrier, respectively, while the output shaft is connected to the sun gear.

In the electrically operated brake according to the above mode (7), the operating speed of the output shaft can be easily increased.

(8) An electrically operated brake according to any one of the above modes (1)–(7), wherein the output shaft has a hole formed so as to extend in an axial direction thereof and open in at least one of opposite end faces thereof, and the friction member driving device includes (a) an output rod which is at least partially inserted in the hole of the output shaft, so as to be axially movable relative to the output shaft, the output rod being engageable with the friction member, and (b) a motion converting mechanism for converting a rotary motion of the output shaft into a linear motion of the output rod, and wherein the two electric motors and the planetary gear device are disposed coaxially with each other, and the output shaft extends through and coaxially with the two electric motors and the planetary gear device.

In the present electrically operated brake, the output rod is at least partially inserted in the hole of the output shaft in the axial direction of the output shaft. Further, the output shaft extends through the two electric motors and the at least one planetary gear. Accordingly, the required overall axial length of the brake can be reduced.

(9) An electrically operated brake according to any one of the above modes (1)–(8), wherein the moving body is a vehicle having a wheel, the electrically operated brake further comprising a rotor rotating with the wheel, and wherein the friction member is forced against a surface of the rotor to restrict rotation of the rotor.

(10) An electrically operated braking system comprising: a brake operating member; a brake operating amount sensor for detecting an amount of operation of the brake operating member; an electrically operated brake defined in any one of the above mode (1)–(9); an electric power source device for supplying power to the two electric motors; and a motor control device for controlling an amount of power to be supplied from the electric power source device to each of the two electric motors, in response to a signal received from the brake operating amount sensor.

(11) An electrically operated braking system according to the above mode (10), wherein the two electric motors of the electrically operated brake are two ultrasonic motors, and the two electric motors are connected to the sun gear and the ring gear, respectively, while the output shaft is connected to the carrier, the motor control device including a ultrasonic motor de-activating device for holding one of the two ultrasonic motors which is connected to the ring gear, in an off state thereof, when a braking force for braking the moving body based on the friction force generated by the friction member is required to be increased to a value exceeding a predetermined threshold.

In the electrically operated braking system according to the above mode (11) of the present invention, the carrier is used as the output member of the planetary gear device, and the detent torque of the ultrasonic motors can be utilized, so that the torque of the output shaft can be easily increased.

(12) An electrically operated braking system according to the above mode (10), wherein the two electric motors are two ultrasonic motors, and the two ultrasonic motors are connected to the sun gear and the ring gear, respectively, while the output shaft is connected to the carrier.

(13) An electrically operated braking system according to the above mode (12), wherein the motor control device includes a braking force increasing device which is operated when a braking force for braking the moving body based on the friction force generated by the friction member is required to be increased, the braking force increasing device including at least one of means for operating the two ultrasonic motors in a forward direction, and means for operating one of the two ultrasonic motors which is connected to the sun gear, in the forward direction, while holding the other ultrasonic motor connected to the ring gear in an OFF state.

The term "forward direction" is interpreted to mean the direction of operation of the ultrasonic motor that permits an increase in the torque of the output shaft (corresponding to the braking force generated by the electrically operated brake).

(14) An electrically operated braking system according to the above mode (12), wherein the motor control device includes a braking force selectively increasing device which is operated when a desired value of a braking force for braking the moving body based on the friction force generated by the friction member is required to be increased, the brake force selectively increasing device operating the two ultrasonic motors in a forward direction if the desired value is not larger than a predetermined threshold, and operating one of the two ultrasonic motors which is connected to the sun gear, in the forward direction, while holding the other ultrasonic motor connected to the ring gear in an OFF state, if the desired value is larger than the predetermined threshold.

In the electrically operated braking system according to the above mode (14), the two ultrasonic motors are both operated in the forward direction when the desired braking force is not larger than the threshold, so that the braking force can be rapidly increased. When the desired braking force is larger than the threshold, on the other hand, the ultrasonic motor connected to the ring gear is held in the OFF state, so as to provide the large detect torque, which permits the braking force to be larger than the threshold.

(15) An electrically operated braking system according to any one of the above modes (12)–(14), wherein the motor control device includes a braking force holding device for holding both of the two ultrasonic motors in an OFF state when the braking force for braking the moving body is required to be maintained at a value substantially equal to a presently established value.

(16) An electrically operated braking system according to any one of the above modes (12)–(15), wherein the motor control device includes a braking force reducing device which is operated when the braking force for braking the moving body is required to be reduced, the braking force reducing device including at least one of means for operating the two ultrasonic motors in a reverse direction, means for operating one of the two ultrasonic motors which is connected to the sun gear, in the reverse direction while holding the other ultrasonic motor connected to the ring gear in an OFF state, and means for operating the above-indicated other ultrasonic motor in the reverse direction while holding the above-indicated one ultrasonic motor in an OFF state.

The term "reverse direction" is interpreted to mean the direction of operation of the ultrasonic motor that permits a decrease in the torque of the output shaft (corresponding to the braking force generated by the electrically operated brake).

(17) An electrically operated braking system according to any one of the above modes (12)–(15), wherein the motor control device includes a braking force selectively reducing device which is operated when the braking force for braking the moving body is required to be reduced, the braking force selectively reducing device operating the two ultrasonic motors in a reverse direction if a required rate of reduction of the braking force is not lower than a predetermined threshold, and operating one of the two ultrasonic motors which is connected to the sun gear, in the reverse direction while holding the other ultrasonic motor connected to the ring gear in an OFF state, or alternatively operating the above-indicated other ultrasonic motor in the reverse direction while holding the above-indicated one ultrasonic motor in an OFF state, if the required rate of reduction is lower than the predetermined threshold.

(18) An electrically operated braking system according to any one of the above modes (10)–(17), wherein the electric power source device includes two separate power sources provided independently of each other for the two electric motors, respectively.

In the electrically operated braking system according to the above mode (18), the electrically operated brake can be operated as long as at least one of the two separate power sources is normally operable. Thus, the present braking system has an improved level of fail-safe reliability regarding the failure of the electric power source device.

(19) An electrically operated braking system according to the above mode (18), wherein the moving body is a vehicle having a plurality of wheels, and the electrically operated brake is provided for each of the plurality of wheels, and includes the two electric motors as a first motor and a second motor, and wherein the two separate power sources are provided as a first power source and a second power source for the electrically operated brakes for all of the plurality of wheel of the vehicle, the first power source supplying power to the first motors of all of the electrically operated brakes, while the second power source supplying power to the second motors of all of the electrically operated brakes.

In the electrically operated braking system according to the above mode (19), the same power source is used for the two or more wheels and for one of the first and second motors of the brake for each of the two or more wheels. In this arrangement, the required number of the separate electric motors for all of the wheels of the vehicle is smaller than in the case where the power source is provided for each of the two electric motors of the brake for each of the wheels. Further, the amounts of power consumption of the two electric motors can be equalized even where the individual brakes (e.g., front and rear brakes) of the wheels have considerably different amounts of power consumption.

(20) An electrically operated braking system according to the above mode (19), wherein the plurality of wheels include at least one front wheel and at least one rear wheel.

BRIEF DESCRIPTION OF THE DRAWINGS

The above and optional objects, features, advantages and industrial and technical significance of this invention will be better understood by reading the following detailed description of presently preferred embodiments of the invention, when considered in conjunction with the accompanying drawings, in which:

FIG. 6 is a view indicating a relationship between a change in the braking force generated by each disc brake and the combination of the operating states of two ultrasonic motors provided in each disc brake, in the first embodiment of FIG. 1;

FIG. 8 is a view indicating a relationship corresponding to that of FIG. 6, in the second embodiment of FIG. 7;

DETAILED DESCRIPTION OF THE PREFERRED EMBODIMENTS

Figure 1:
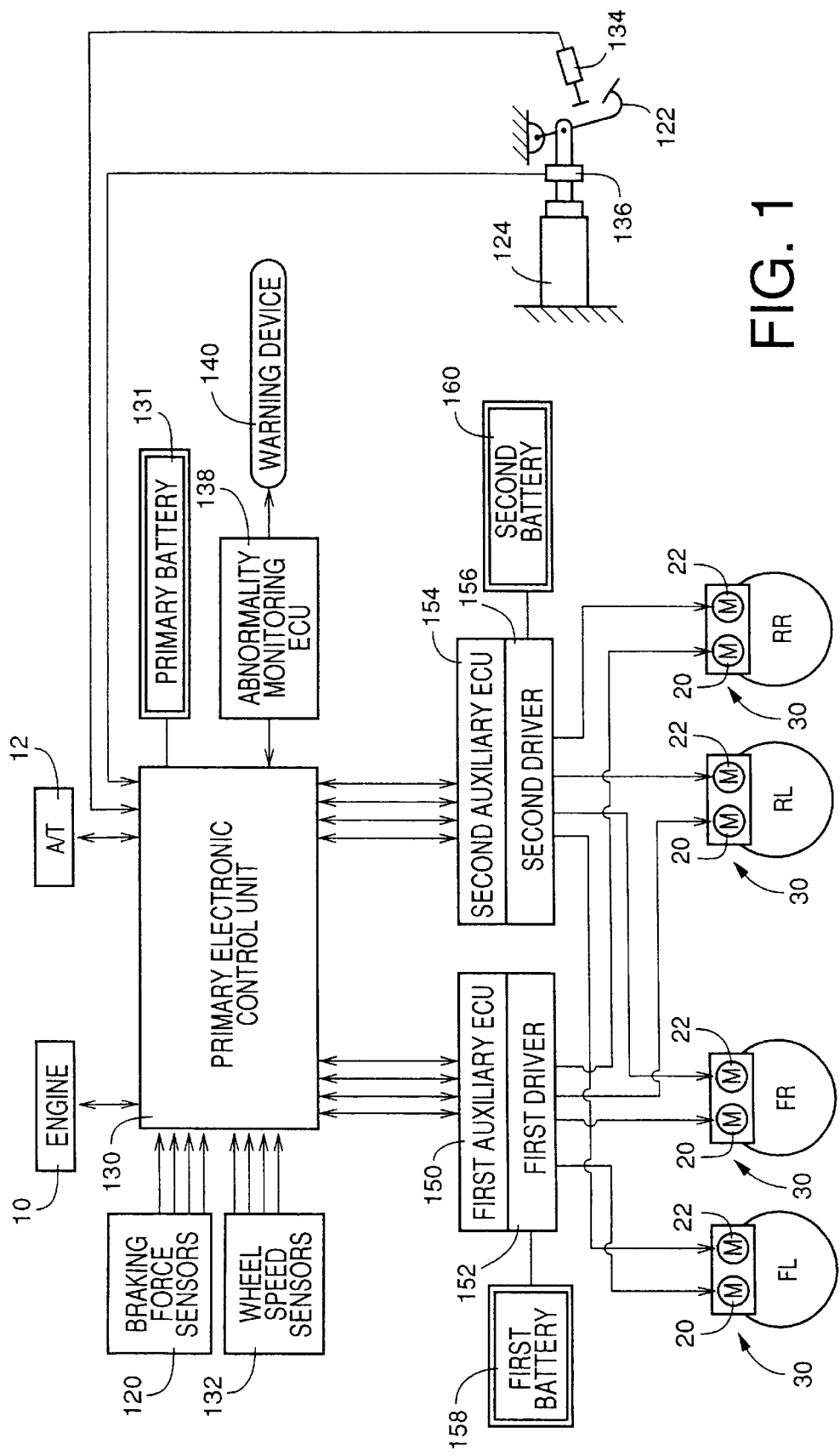
FIG. 1 is a schematic view showing a general arrangement of an electrically operated braking system including electrically operated disc brakes constructed according to one embodiment of this invention.

Referring first to FIGS. 1–6, there will be described an electrically operated braking system including electrically operated disc brakes 30 constructed according to the first embodiment of this invention. The general arrangement of this braking system is shown in FIG. 1. The braking system is constructed for and provided on a four-wheel automotive vehicle having front left and right wheels FL, FR and rear left and right wheels RL, RR, a drive power source in the form of an internal combustion engine 10, and a power transmitting device in the form of an automatic transmission 12 (abbreviated as "A/T" in FIG. 1) for transmitting an output of the engine 10 to at least one of the front and rear pairs of wheels FL, FR, RL, RR. Each of the front and rear wheels is provided with the electrically operated disc brake 30, which includes two ultrasonic motors 20, 22 as a drive source for generating a braking force, as indicated in FIG. 1.

Figure 2:
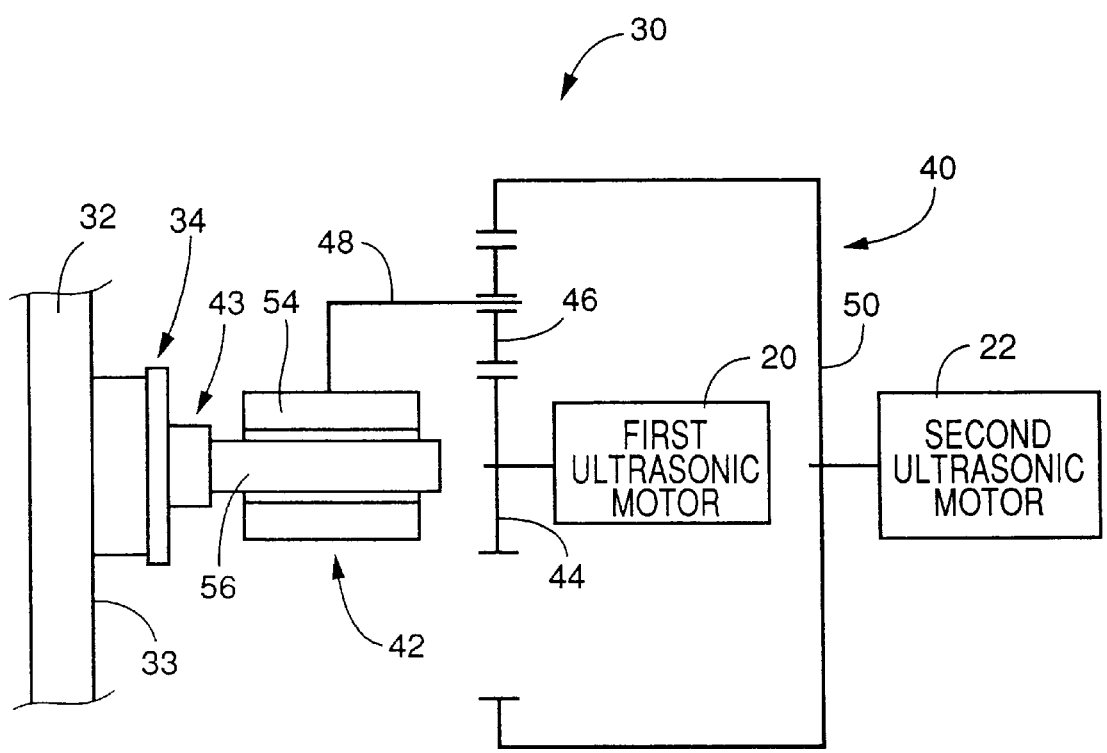
FIG. 2 is an enlarged view schematically showing one of the electrically operated disc brakes of the braking system of FIG. 1.

Reference is now made to FIG. 2, which schematically shows the construction of each disc brake 30.

The disc brake 30 includes a disc rotor 32 rotating with the corresponding wheel FL, FR, RL, RR, and a friction pad 34 which is adapted to be forced against a friction surface of the disc rotor 32, for thereby restricting the rotary motion of the disc rotor 32, that is, for braking the disc rotor 32. For transferring drive torques of the two ultrasonic motors 20, 22 to the friction pad 34, there are disposed a planetary gear device 40, a motion converting mechanism 42 in the form of a ballscrew mechanism 42, and a presser member 43, in the order of description, between the ultrasonic motors 20, 22 and the friction pad 34.

Figure 14:
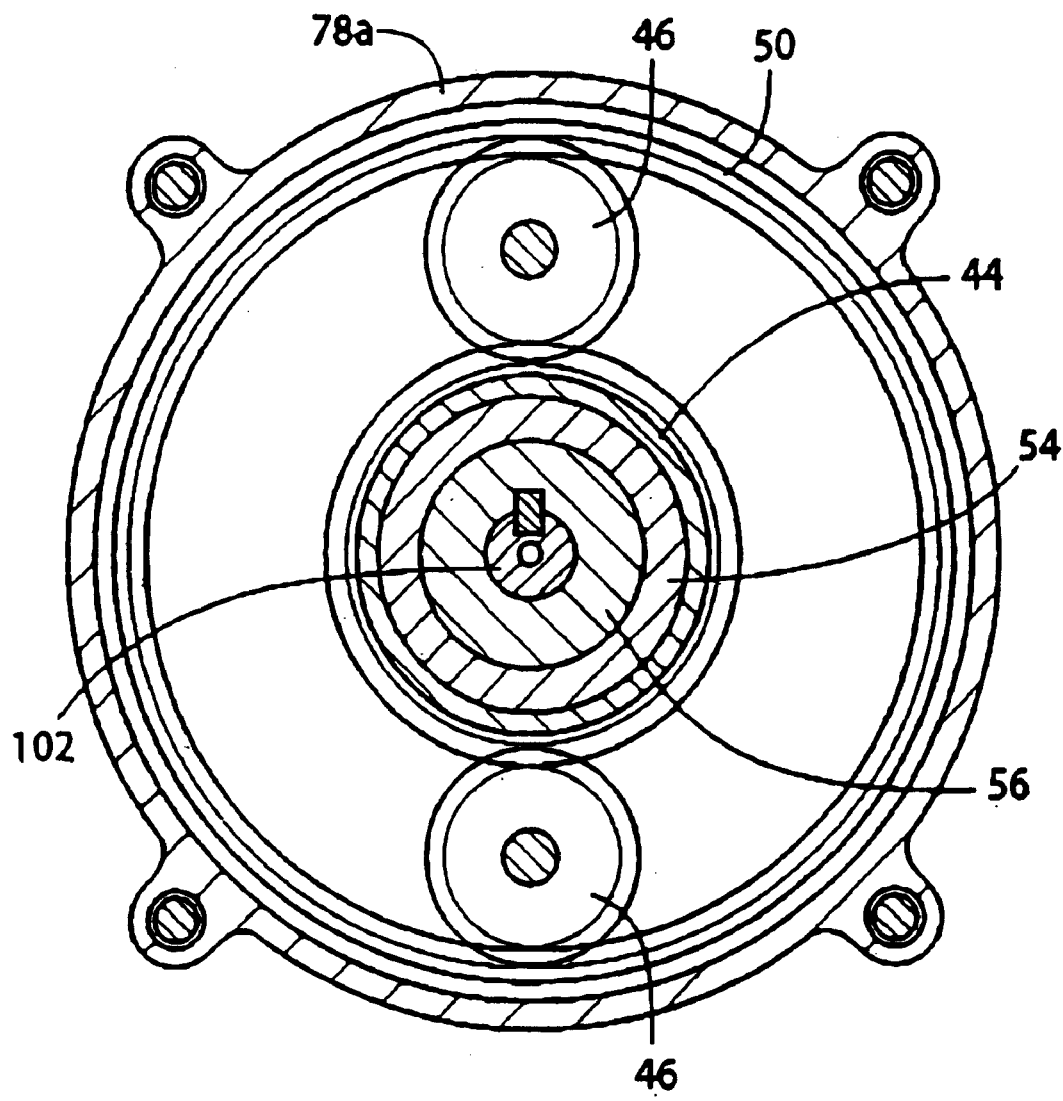
FIG. 14 is a cross sectional view taken along line 14—14 in FIG. 3.

As well known in the art and as shown in FIG. 14, the planetary gear device 40 includes: a sun gear 44; a plurality of planetary gears 46 (only one of them being shown in FIG. 2) which are arranged radially outwardly of the sun gear 44 and mesh with the sun gear 44; a carrier 48 which is coaxial with the sun gear 44 and supports the planetary gears 46 such that each planetary gear 46 is rotatable about its axis while the planetary gears 46 are rotatable about the axis of the sun gear 44 such that the planetary gears 46 maintain a predetermined relative position in the rotating direction of the sun gear; and an internal or ring gear 50 which is coaxial with the sun gear 44 and meshes with the planetary gears 46. The ring gear 50 is an internally toothed gear having a multiplicity of teeth formed on its inner circumferential surface. The first ultrasonic motor 20 is connected to the sun gear 44 while the second ultrasonic motor 22 is connected to the ring gear 50. The presser member 53 is connected to the carrier 48 through the ballscrew mechanism 42. Thus, the carrier 46 functions as the output member of the planetary gear device 40.

The ballscrew mechanism 42 includes an output shaft in the form of an internally threaded member 54, and an externally threaded member 56 which engages the externally threaded member 54 via a plurality of balls, as well known in the art. The externally threaded member 56 cooperates with the presser member 43 to constitute an output rod which is axially movable relative to the internally threaded member or output shaft 54 and which is engageable with the friction pad 34a. The carrier 48 of the planetary gear device 40 is fixed to the outer circumferential surface of the internally threaded member 54 so that the carrier 48 and the internally threaded member 54 are rotated as a unit. The internally threaded member 54 is rotatable about its axis but is not axially movable. On the other hand, the externally threaded member 56 is axially movable but is not rotatable about its axis. In this arrangement, a rotary motion of the internally threaded member 54 is converted into a linear or axial motion of the externally threaded member 56. The presser member 43 engages an end portion of the externally threaded member 56 on the side of the friction pad 34, which end portion projects a small distance out of the internally threaded member 54 when the externally threaded member 56 is moved toward the friction pad 34. Thus, the presser member 43 functions to transfer a force from the externally threaded member 56 to the friction pad 34.

Figure 3:
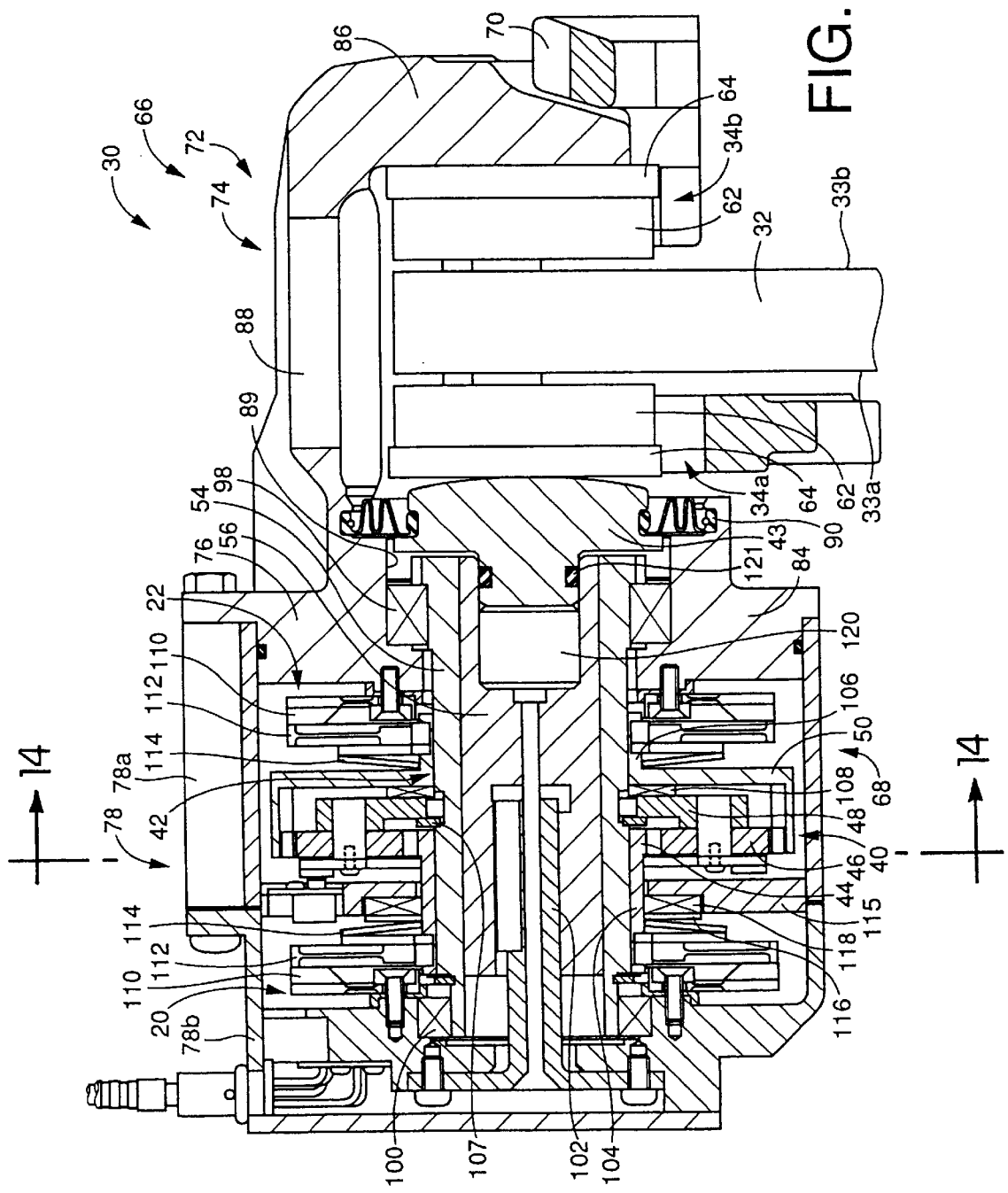
FIG. 3 is an enlarged side elevational view in cross section of the disc brake of FIG. 2.

Referring next to FIG. 3, the construction of the disc brake 30 will be described in detail.

The disc rotor 32 has a pair of opposite friction surfaces 33a, 33b. The disc brake 30 includes a pair of friction pads 34a, 34b which are disposed so as to face the respective friction surfaces 33a, 33b of the disc rotor 32. Each friction pad 34a, 34b consists of a friction member 62 for frictional contact with the corresponding friction surface 33a, 33b, and a backing plate 64 fixed to the back surface of the friction member 62.

The disc brake 30 further includes a pad support mechanism 66 and a pad presser mechanism 68.

The pad support mechanism 66 will be explained first.

The pad support mechanism 66 includes a mounting bracket 70 which is supported at its one end by the vehicle body, so as to extend over the periphery of the disc rotor in a cantilever fashion. The mounting bracket 70 includes (a) a pad support portion for supporting the pair of friction pads 34a, 34b such that the friction pads 34a, 34b are disposed on the opposite sides of the disc rotor 32 and are movable in a direction intersecting the friction surfaces 33a, 33b of the disc rotor 32, and (b) a torque receiving portion for receiving torques transferred to the friction pads 34a, 34b from the disc rotor 32 upon frictional contact of the friction pads 34a, 34b with the friction surfaces 33a, 33b of the disc rotor 32.

Then, the pad presser mechanism 68 will be explained.

The pad presser mechanism 68 includes a caliper 72 having a section extending over the periphery of the disc rotor 32 and sections for forcing the friction pads 34a, 34b against the friction surfaces 33a, 33b of the disc rotor 32. The caliper 72 is supported by a pair of support mechanisms each including a slide pin which is secured to the mounting bracket 70, so as to extend in parallel with the axis of rotation of the disc rotor 32. The caliper 72 is slidably movable in the direction of extension of the slide pins of the support mechanism, that is, in the axial direction of the disc rotor 32. The caliper 72 includes a pad presser portion 74 and a motor carrier portion 76. The motor carrier portion 76 has a motor housing 78 fixed thereto by screws. The motor housing 78 consists of two pieces 78a, 78b.

The pad presser portion 74 of the caliper 72 includes a pressing portion 84, a reaction portion 86 and a connecting portion 88 connecting the pressing and reaction portions 84, 86. The pressing portion 84 is located inwardly of the inner friction pad 34a which is located inwardly of the outer friction pad 34b, as viewed in the lateral or transverse direction of the vehicle. The pressing portion 84 accommodates the presser member 43 for pressing the inner friction pad 34a against the rotor disc 32. The reaction portion 86 is located outwardly of the outer friction pad 34b as viewed in the lateral direction of the vehicle, for pressing the outer friction pad 34b against the disc rotor 32, with a reaction force which the pressing portion 84 receives from the inner friction pad 34a when the inner friction pad 34a is pressed by the presser member 43. The connecting portion 88 extends over the periphery of the disc rotor 32, so as to connect the pressing portion 84 and the reaction portion 86 to each other.

The pressing portion 84 has a through-hole 89 behind the inner friction pad 34a and coaxially with the disc rotor 32. The presser member 43 is accommodated in the through-hole 89 such that the presser member 43 is movable in the axial direction of the disc rotor 32. The presser member 43 has a part-spherical surface for contact with the inner friction pad 34a. A sealing member 90 is disposed between the presser member 43 and the pressing portion 84 of the pad presser portion 74 of the caliper 72. The sealing member 90 prevents entry of foreign matters into the through-hole 89 formed in the pressing portion 84, while permitting a relative movement of the presser member 43 and the pressing portion 84.

In the ballscrew mechanism 42, the internally threaded member 54 is supported by the caliper 72 and the motor housing 78, via a radial thrust bearing 98 and a radial bearing 100, such that the internally threaded member 54 is rotatable but is not axially movable. The piece 78b of the motor housing 78 has a rotation preventing member 102 fixed thereto. The rotation preventing member 102 includes a cylindrical portion which engages the externally threaded member 56 such that the externally threaded member 56 is axially movable but is not rotatable. In the present embodiment, the rotation preventing member 102 is keyed to the externally threaded member 56. However, the rotation preventing member 102 may be splined to the externally threaded member 102.

The ultrasonic motors 20, 22 and the planetary gear device 40 are disposed coaxially with the internally threaded member 54 such that the internally threaded member 54 extends through the bores of the ultrasonic motors 20, 22 and planetary gear device 40. The two ultrasonic motors 20, 22 are disposed on the axially opposite sides of the planetary gear device 40. The constructions of the planetary gear device 40 and the ultrasonic motors 20, 22 will be described in detail.

The planetary gear device 40 includes two cylindrical members 104, 106 which are fitted on the outer circumferential surface of the internally threaded member 54 such that the cylindrical members 104, 106 are rotatable but are not axially movable. The sun gear 44 is formed integrally with the cylindrical member 104. That is, the cylindrical member 104 has teeth formed on its outer circumferential surface. Similarly, the ring gear 50 is formed integrally with the cylindrical member 106. That is, the cylindrical member 106 has teeth formed on its inner circumferential surface. Although the sun gear 44 and the ring gear 50 are formed integrally with the respective cylindrical members 104, 106, those gears 44, 50 may be formed separately from the cylindrical members 104, 106. In this case, the gears 44, 50 are fixed to the respective cylindrical members 104, 106, coaxially with the cylindrical members 104, 106. The carrier 48 is fixed to the internally threaded member 54 such that the carrier 48 is not rotatable relative to the internally threaded member 54 and such that the axial movement of the carrier 48 is prevented by a stop member 107. In this arrangement, a rotary motion of the carrier 48 causes a rotary motion of the internally threaded member 54. A thrust bearing 108 is interposed between the carrier 48 and the ring gear 50 in the axial direction.

Each of the ultrasonic motors 20, 22 is of a travelling wave type, including a stator 110, a rotor 112, and a pressing member 114 (e.g., coned-disc spring). In operation, the stator 110 produces a surface wave upon application of a ultrasonic vibration thereto, and the rotor 112 is rotated with a friction force acting between the stator 110 and the rotor 112. The rotor 112 is biased against the stator 110 by the pressing member 114, so that a suitable amount of friction force acts between the stator 110 and the rotor 112.

In the first ultrasonic motor 20 which is located on one axial side of the planetary gear device 40 remote from the disc rotor 32 (friction pads 34a, 34b), the stator 110 is fixed to the piece 78b of the motor housing 78. The rotor 112 is fixed to the cylindrical member 104 such that the cylindrical member 104 is rotated with the rotor 112. In this arrangement, a rotary motion of the rotor 112 causes a rotary motion of the cylindrical member 104, that is, a rotary motion of the sun gear 44 formed integrally with the cylindrical member 104. The pressing member 114 is interposed between the rotor 112 and a support portion 115 of the portion 78a of the motor housing 78. Described more precisely, a washer 116 and a thrust bearing 118 are interposed between the support portion 115 and the pressing member 114. In the thus constructed first ultrasonic motor 20 located between the two pieces 78a, 78b of the motor housing 78, the rotor 112 is held biased against the stator 110 under a biasing force of the pressing member 114 such that the stator, 110, rotor 112 and pressing member 114 are rotatable as a unit. The thrust bearing 118 may be replaced by a radial bearing.

The second ultrasonic motor 22 is located on the other axial side of the planetary gear device 40, namely, on the side of the disc rotor 32. In the second ultrasonic motor 22, the stator 110 is fixed to the caliper 72, and the rotor 112 is fixed to the cylindrical member 106 for rotation with the cylindrical member 106. In this arrangement, a rotary motion of the rotor 112 of the second ultrasonic motor 22 causes a rotary motion of the cylindrical member 106, namely, a rotary motion of the ring gear 50 formed integrally with the cylindrical member 106. The pressing member 114 is interposed between the rotor 112 and the ring gear 50. Thus, the stator 110, rotor 112 and pressing member 114 of the second ultrasonic motor 22, and the carrier 48 and the ring gear 50 of the planetary gear device 40 are interposed between the caliper 72 and the stop member 107, together with the thrust bearing 108 disposed between the carrier 48 and the ring gear 50.

As shown in FIG. 1, the four disc brakes 30 are provided with respective braking force sensors 120, each of which is adapted to detect a force by which the externally threaded member 56 presses the presser member 43 onto the inner friction pad 34a. The detected force is used as a quantity relating to the braking force which is applied from the disc brake 30 to the corresponding wheel FL, FR, RL, RR. As shown in FIG. 3, the presser member 43 has a cylindrical portion which axially slidably engages a hole formed in the corresponding end portion of the externally threaded member 56. The braking force sensor 120 is accommodated in a bottom portion of the hole of the externally threaded member 56, so that an axial force is transferred from the externally threaded member 56 to the presser member 43 through the braking force sensor 120. In FIG. 3, reference numeral 121 denotes a rubber sealing member.

The present braking system has a brake operating member in the form of a brake pedal 122, as shown in FIG. 1. The brake pedal 122 is linked to a stroke rendering device 124, which is arranged to permit the brake pedal 122 to be depressed by an amount corresponding to an operating force which acts on the brake pedal 122. In the presence of the stroke rendering device 124, the operator of the brake pedal 122 can be given substantially the same brake operating feel as given by a brake pedal in a hydraulically operated braking system wherein a disc brake for each wheel is operated by a hydraulic pressure corresponding to the operating force acting on the brake pedal. The stroke rendering device 124 includes: a housing; a link member which is connected to the brake pedal 122 and supported by the housing such that the link member is movable upon operation of the brake pedal 122; and an elastic member which is interposed between the housing and the link member, so as to permit a movement of the link member and give the link member a reaction force which changes with the operating stroke or force of the brake pedal 122.

While the mechanical arrangement of the present electrically operated braking system has been described above, the electrical arrangement of the same will be described.

As shown in FIG. 1, the braking system is provided with a primary electronic control unit (abbreviated as "primary ECU" in FIG. 1) 130. Like other electronic control units which will be described, the primary electronic control unit 130 is constituted principally by a computer incorporating a central processing unit (CPU), a read-only memory (ROM) and a random-access memory (RAM). The primary electronic control unit 130 is powered by a primary battery 131.

To the primary electronic control unit 130, there are electrically connected four wheel speed sensors 132 for the respective four wheels FL, FR, RL, RR, as well as the four braking force sensor 120 for the respective four wheels. Each wheel speed sensor 132 is adapted to detect the peripheral speed of the corresponding wheel. Also connected to the primary electronic control unit 130 is a brake operation sensor in the form of a brake pedal switch 134, which is turned ON when the brake pedal 122 is operated or depressed, and is OFF when the brake pedal 122 is placed in its non-operated position. To the control unit 130, there are also connected two brake operating force sensors 136 (only one of them being shown in FIG. 1) for detecting the operating force acting on the brake pedal 122. The two brake operating force sensors 136 are provided so that in the event of some failure of one of these two sensors 136, the other sensor 136 is normally operable to detect the brake operating force. The braking system is provided with an abnormality monitoring electronic control unit (abbreviated as "abnormality monitoring ECU" in FIG. 1) 138 for diagnosing the electrical system of each disc brake 30 for any abnormality. This abnormality monitoring electronic control unit 138 is also connected to the primary electronic control unit 130, and is adapted to activate a warning device 140 upon detection of any abnormality, to inform the operator of the vehicle of this fact. The warning device 140 may be a buzzer, an indicator light or any other device.

The first ultrasonic motors 20 of the four disc brakes 30 are connected to the primary electronic control unit 130 through a first auxiliary electronic control unit (abbreviated as "first auxiliary ECU" in FIG. 1) and a first driver 152, while the second ultrasonic motors 22 of the four disc brakes 30 are connected to the control unit 130 through a second auxiliary electronic control unit (abbreviated as "second auxiliary ECU" in FIG. 1) and a second driver 154. The first driver 152 is connected to a first auxiliary battery 158, and controls an amount of power to be supplied to each of the four first ultrasonic motors 20, based on control signals received from the first auxiliary electronic control unit 150. Similarly, the second driver 156 is connected to a second auxiliary battery 160, and controls an amount of power to be supplied to each of the four second ultrasonic motors 22, based on control signals received from the second auxiliary electronic control unit 154. Thus, the set of four first ultrasonic motors 20 and the set of four second ultrasonic motors 22 are controlled independently of each other, by the respective first and second auxiliary electronic control units 150, 154 through the respective first and second drivers 152, 156, which are connected to the respective first and second auxiliary batteries 158, 160. It is noted that the primary electronic control unit 130 is assigned to control also the engine 10 and the automatic transmission 12 through respective auxiliary control devices. The two auxiliary batteries 158, 160 constitute an electric power source device for supply power to the two ultrasonic motors 20, 22.

Figure 4:
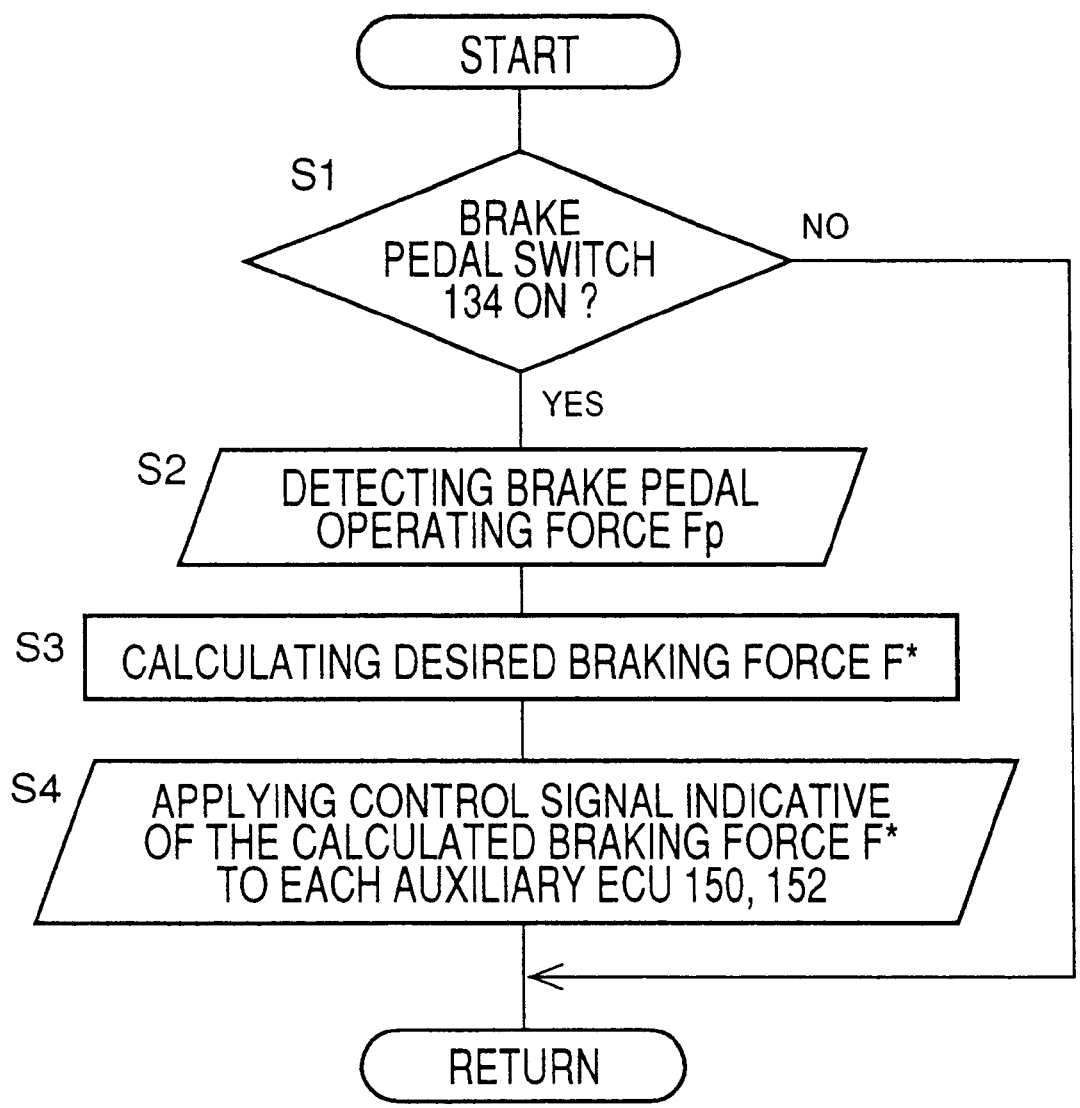
FIG. 4 is a flow chart illustrating a primary brake control routine according to a control program stored in a ROM of a computer of a primary electronic control unit, for controlling the braking system of FIG. 1.

The ROM of the primary electronic control unit 130 stores a control program for executing a primary brake control routine illustrated in the flow chart of FIG. 4. This primary brake control routine is repeatedly executed. Each cycle of execution of the primary brake control routine is initiated with step S1 to determine whether the brake pedal switch 134 is placed in its ON state, that is, whether the brake pedal 122 has been depressed. If a negative decision (NO) is obtained in step S1, one cycle of execution of the routine is terminated. If an affirmative decision (YES) is obtained in step S1, the control flow goes to steps S2–S4.

In step S2, an operating force Fp acting on the brake pedal 122 is detected by the operating force sensor 136. Step S2 is followed by step S3 in which a desired braking force F* for each wheel is calculated on the basis of the detected brake pedal operating force Fp. The desired braking force F* for each wheel is calculated by taking account of various factors, such as an optimum distribution of the braking force to the front and rear wheels. Then, the control flow goes to step S4 in which control signals indicative of the calculated desired braking force F* are applied to the first and second auxiliary electronic control units 150, 154. Thus, one cycle of execution of the primary brake control routine of FIG. 4 is completed.

Figure 5:
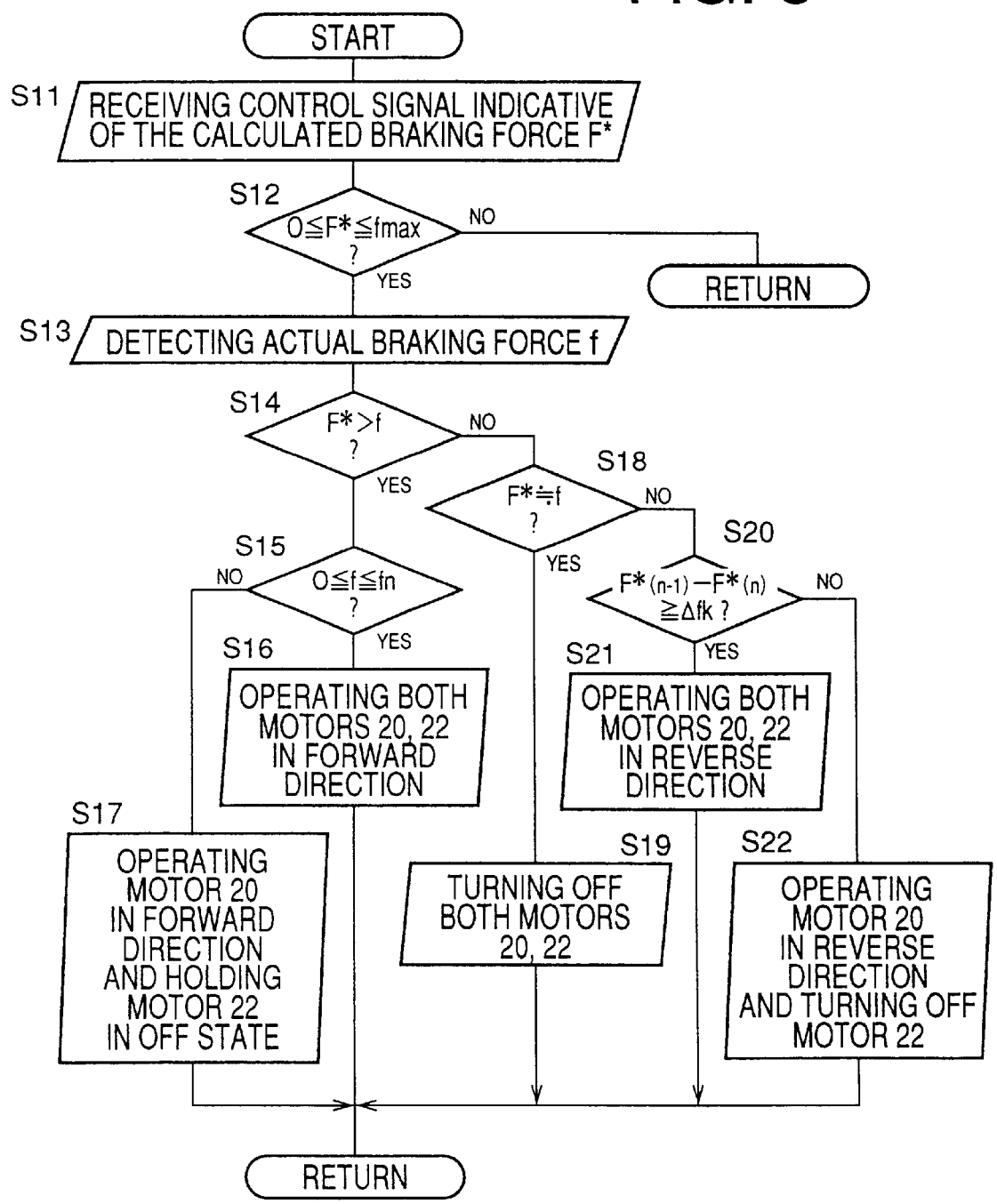
FIG. 5 is a flow chart illustrating an auxiliary brake control routine according to a control program stored in a ROM of a computer of each of first and second auxiliary electronic control units, for controlling each disc brake of the braking system of FIG. 1.

The ROM of each auxiliary electronic control unit 150, 154 stores a control program for executing an auxiliary brake control routine illustrated in the flow chart of FIG. 5. While this auxiliary brake control routine will be described, the principle of control of the first and second ultrasonic motors 20, 22 will be first explained by reference to the table of FIG. 6.

The planetary gear device 40 has a relationship represented by the following equation:

$$T_r/Z_r = T_s/Z_s$$

wherein, $Z_s$: number of teeth of the sun gear 44;

$Z_r$: number of teeth of the ring gear 50;

$T_s$: torque of the sun gear 44; and $T_r$: torque of the ring gear 50.

The above equation can be converted into the following equation:

$$T_r = (Z_r/Z_s) \cdot T_s$$

This equation can be converted into the following equation:

$$T_r = (1/\lambda) \cdot T_s$$

wherein $\lambda$ represents a ratio $S_z/Z_r$ of the number of teeth of the sun gear 44 to the number of teeth of the ring gear 50.

Since the gear ratio $\lambda$ is usually smaller than one, the ring gear 50 is required to produce a torque larger than that produced by the sun gear 44. On the other hand, each ultrasonic motor 20, 22 placed in an OFF state is capable of producing a detent torque which is larger than its maximum drive torque $T_{max}$. For instance, a maximum value $T_{max}$, of the detent torque is about twice the maximum drive torque $T_{max}$. When the torque of the ring gear 50 required to produce a desired braking force for the corresponding wheel is not larger than the maximum drive torque $T_{max}$, the desired braking force can be produced by activating both of the first and second ultrasonic motors 20, 22. When the torque of the ring gear 50 required to reduce the desired braking force is larger than the maximum drive torque $T_{max}$ of each ultrasonic motor 20, 22, it is required to hold the second ultrasonic motor 22 in the OFF state for generating the detent torque and activate the first ultrasonic motor 20.

In view of the above fact, the first and second ultrasonic motors 20, 22 are controlled in the following manner in the present embodiment:

(1) Where $0 \leq T_s \leq \lambda \cdot T_{max}$

In this case, the torque to be produced by the second ultrasonic motor 33 whose rotor 112 is connected to the ring gear 50 is not larger than the maximum drive torque $T_{max}$. Therefore, the first and second ultrasonic motors 20, 22 are activated so that the carrier 58 produces the desired torque $T_c$, which is represented by the following equation:

$$T_c = (1+1/\lambda) \cdot T_s \leq (1+1/\lambda) \cdot \lambda \cdot T_{max}$$

In the present case, the two ultrasonic motors 20, 22 are both operated in the forward direction, so that the carrier 48 is rotated at a higher speed than in the case where only the first ultrasonic motor 20 is rotated.

(2) $\lambda \cdot T_{max} < T_s \leq \lambda \cdot T_{max'}$

In this case, the second ultrasonic motor 22 whose rotor 112 is connected to the ring gear 50 is required to produce a torque larger than the maximum drive torque $T_{max}$. Therefore, the second ultrasonic motor 22 is held OFF to produce the detent torque $T_{max'}$ while the first ultrasonic motor whose rotor 112 is connected to the sun gear 44 is activated, so that the carrier 48 produces the desired torque $T_c$, which is represented by the following equation:

$$T_c = (1+1/\lambda) \cdot T_s \leq (1+1/\lambda) \cdot \lambda \cdot T_{max'}$$

In the present case in which only the sun gear 44 is rotated while the ring gear 40 is held stationary, the carrier 48 is rotated at a speed $N_c$ represented by the following equation:

$$N_c = \{\lambda/(\lambda+1)\} \cdot N_s$$

wherein $N_s$ represents the rotating speed of the sun gear 44.

It is noted that while the second ultrasonic motor 22 is OFF, the ring gear 50 is not always held stationary, but may be rotated at a low speed.

When the disc brake 30 is required to increase the actual braking force for the corresponding wheel, the two ultrasonic motors 20, 22 are both operated in the forward direction, if the desired braking force F* to be achieved is not larger than a threshold value $f_n$. If the desired braking force F* is larger than the threshold $f_n$, however, only the first ultrasonic motor 20 whose rotor 112 is connected to the sun gear 44 is operated in the forward direction while the second ultrasonic motor 22 whose rotor 112 is connected to the ring gear 50 is held in the OFF state.

When the disc brake 30 is required to maintain the present braking force for the corresponding wheel, the two ultrasonic motors 20, 22 are both held in the OFF state.

When the disc brake 30 is required to reduce the actual braking force for the corresponding wheel, the two ultrasonic motors 20, 22 are both operated in the reverse direction, if it is required to rapidly reduce the braking force.

However, only the first ultrasonic motor 20 is operated in the reverse direction while the second ultrasonic motor 22 is held in the OFF state, if it is required to slowly reduce the braking force.

Then, the auxiliary brake control routine of FIG. 5 for controlling each of the disc brakes 30 will be described in detail by reference to the flow chart of FIG. 5.

This auxiliary brake control routine of FIG. 5 is also repeatedly executed. Each cycle of execution of this routine is initiated with step S11 in which the first or second auxiliary electronic control unit 150, 154 receives from the primary electronic control unit 130 the control signal indicative of the calculated desired braking force F*. Then, step S12 is implemented to determine whether the desired braking force F* is equal to or larger than zero and is equal to or smaller than an upper limit $f_{max}$, that is, determine whether the desired braking force F* is in a normal range. If a negative decision (NO) is obtained in step S12, one cycle of execution of the routine of FIG. 5 is immediately terminated. If an affirmative decision (YES) is obtained in step S12, that is, if the calculated desired braking force F* is in the normal range, the control flow goes to step S13.

In step S13, the actual braking force f is detected by the braking force sensor 120 for each wheel. Step S13 is followed by step S14 to determine whether the desired braking force F* is larger than the detected actual braking force f, that is, to determine whether it is required to control the ultrasonic motors 20, 22 so as to increase the actual braking force f to the desired value F*. If an affirmative decision (YES) is obtained in step S14, the control flow goes to step S15 to determine whether the detected actual braking force f is equal to or larger than zero and is equal to or smaller than the threshold value $f_n$. If an affirmative decision (YES) is obtained in step S15, the control flow goes to step S16 in which the first and second ultrasonic motors 20, 22 are both activated in the forward direction. Thus, one cycle of execution of the routine is completed.

If a negative decision (NO) is obtained in step S15, the control flow goes to step S17 in which the first ultrasonic motor 20 is activated in the forward direction while the second ultrasonic motor 22 is held in the OFF state. Thus, one cycle of execution of the routine is completed.

Where the desired braking pressure F* is not larger than the detected actual braking force f, a negative decision (NO) is obtained in step S14, and the control flow goes to step S18 to determine whether the desired braking force F* is substantially equal to the actual value f. If an affirmative decision (YES) is obtained in step S18, the control flow goes to step S19 in which the first and second ultrasonic motors 20, 22 are both held in the OFF state. Thus, one cycle of execution of the routine is completed.

If a negative decision (NO) is obtained in step S18, that is, if the actual braking force f is required to be reduced to the desired braking force F*, the control flow goes to step S20 to determine whether an amount of decrease of the desired braking force F* is equal to or larger than a threshold $\Delta f_K$. The amount of decrease of the desired braking force F* is equal to the desired braking force $F^*_{(n-1)}$ in the last control cycle minus the desired braking force $F^*_{(n)}$ in the present control cycle. It will be understood that step S20 is provided to determine whether the actual braking force f is required to be rapidly reduced or decreased. If an affirmative decision (YES) is obtained in step S20, the control flow goes to step S21 in which the first and second ultrasonic motors 20, 22 are both activated in the reverse direction. Thus, one cycle of execution of the routine is completed. If a negative decision (NO) is obtained in step S20, that is, if the actual braking force f is required to be slowly decreased, the control flow goes to step S22 in which the first ultrasonic motor 20 is activated in the reverse direction while the second ultrasonic motor is held in the OFF state. Thus, one cycle of execution of the routine is completed.

In the present braking system, the vehicle can be braked by utilizing the detent torque of the second ultrasonic motor 22 whose rotor 112 is connected to the ring gear 50, so that the disc brake 30 for each wheel is capable of producing a larger braking force than in the case where the detent torque of an ultrasonic motor is not utilized.

When the actual braking force f is not larger than the threshold $f_n$, that is, when the actual braking force f is relatively small, the braking force can be increased by activating both of the two ultrasonic motors 20, 22 in the forward direction. In this case, the braking force can be increased at a higher rate than in the case where only one of the two ultrasonic motors 20, 22 is activated.

The present braking system including the two ultrasonic motors 20, 22 for each disc brake 30 is advantageous in that in the even of one of the ultrasonic motors 20, 22 during operation of the disc brake 30, the operated disc brake 30 can be restored to the non-operated state by operation of the other ultrasonic motor.

Further, since the two ultrasonic motors 20, 22 for each disc brake 30 are energized by the respective mutually independent first and second auxiliary batteries 158, 160, the disc brake 30 can be operated as long as at least one of the ultrasonic motors 20, 22 is normal.

Since each of the two auxiliary batteries 158, 160 is used for the disc brakes 30 for the front and rear wheels, there does not arise a considerable difference between the amounts of power consumption of the two auxiliary batteries 158, 160. Where one of the two batteries 158, 160 is used for the disc brakes 30 for the front wheels while the other battery is used for the disc brakes 30 for the rear wheels, the amounts of power consumption of the two batteries may be considerably different from each other.

It will be understood from the above description of the first embodiment of this invention that the externally threaded member 56, the ballscrew mechanism 42 and the presser member 43 cooperate with each other to constitute a friction member driving device for driving the friction member in the form of the friction pads 34a, 34b, and that each of the operating force sensors 136 functions as a brake operating amount sensor for detecting the operating amount of the brake pedal 122. It will also be understood that the first and second auxiliary batteries 158, 160 functioning as separate power sources cooperate with each other to constitute the electric power source device for energizing the two electric motors 20, 22.

It will further be understood that the primary electronic control unit 130 and the first and second auxiliary electronic control units 150, 154 cooperate with each other to constitute a motor control device for controlling the ultrasonic motors 20, 22. It will also be understood that portions of the first and second auxiliary electronic control units 150, 154 assigned to implement steps S15 and S17 constitute a ultrasonic motor de-activating device for holding the second ultrasonic motor 22 in the OFF state when the desired braking force F* is larger than the predetermined threshold $f_n$. It will also be understood that portions of the electronic control units 150, 154 assigned to implement steps S14, S16 and S17 constitute a braking force increasing device for operating the two ultrasonic motors 20, 22 in the forward directions, or operating the first ultrasonic motor 20 in the forward direction while holding the second ultrasonic motor 22 in the OFF state, when it is necessary to increase the actual braking force f. It will further be understood that portions of the electronic control units 150, 154 assigned to implement steps S14–S17 constitute a braking force selectively increasing device for operating the two ultrasonic motors 20, 22 in the forward direction when the desired braking force F* is not larger than the threshold $f_n$, and operating the first ultrasonic motor 20 in the forward direction while holding the second ultrasonic motor 22 in the OFF state when the desired braking force F* is larger than the threshold $f_n$. It will also be understood that portions of the electronic control units 150, 154 assigned to implement steps S21, S22 constitute a braking force reducing device for reducing the braking force. It will further be understood that portions of the electronic control units 150, 154 assigned to implement steps S20–S22 constitute a braking force selectively reducing device for operating the two ultrasonic motors 20, 22 in the reverse direction when a required rate of reduction of the braking force is not lower than the predetermined threshold $\Delta f_k$, and operating the first ultrasonic motor 20 in the reverse direction while holding the second ultrasonic motor 22 in the OFF state when the desired rate of reduction is lower than the threshold.

Figure 7:
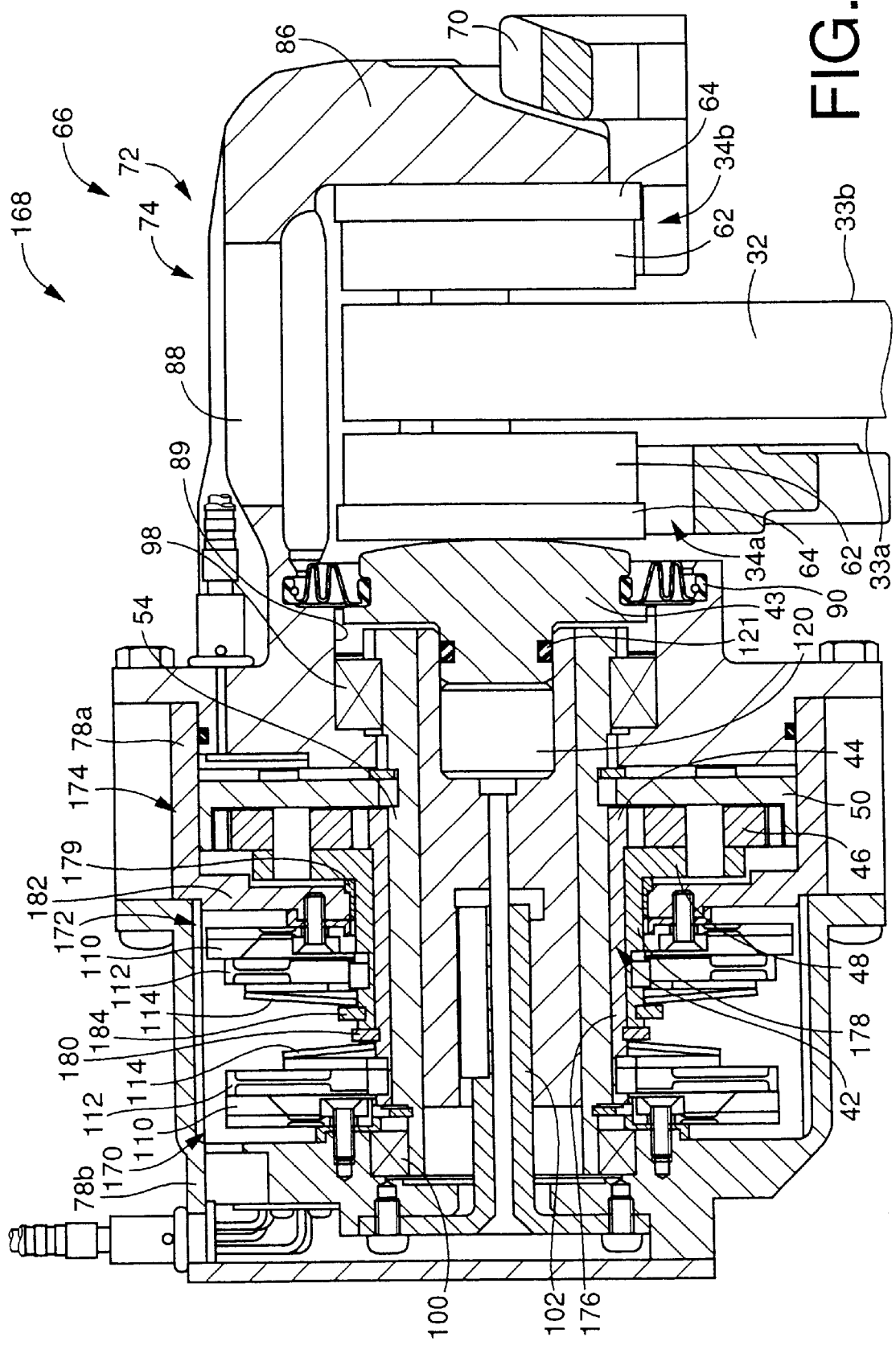
FIG. 7 is an enlarged side elevational view in cross section of an electrically operated braking system including electrically operated disc brakes constructed according to a second embodiment of this invention.

Referring next to FIGS. 7 and 8, there will be described a second embodiment of this invention, which is different from the first embodiment only in that a disc brake 168 for each wheel includes two ultrasonic motors 170, 172 which are disposed on the same side of a planetary gear device 174 and in that the ring gear 50 functions as an output member of the planetary gear device 174. The same reference numerals as used in the first embodiment will be used in this second embodiment, to identify the corresponding elements, and only the planetary gear device 174 and the related aspects of the disc brake 168 will be described.

In the disc brake 168, the two ultrasonic motors 170, 162 are both disposed on one of opposite axial sides of the planetary gear device 174, which is remote from the disc rotor 32 (pair of friction pads 34a, 34b).

The planetary gear device 174 includes a cylindrical member 176 fitted on the internally threaded member 54 such that the cylindrical member 176 is rotatable relative to the internally threaded member 54. The sun gear 44 is formed integrally and coaxially with the cylindrical member 176. A cylindrical member 178 is fitted on the outer circumferential surface of the cylindrical member 176 such that the cylindrical member 178 is rotatable relative to the cylindrical member 176. The piece 78a of the motor housing 78 has a sleeve 179 serving as a plain or sliding bearing in which the cylindrical member 178 is rotatably supported with its outer circumferential surface held in sliding contact with the inner circumferential surface of the plain bearing 179. The carrier 48 is formed integrally and coaxially with the cylindrical member 178. The ring gear 50 is fixed to the internally threaded member 54 such that the ring gear 50 is rotatable with the internally threaded member 54. That is, the ring gear 50 is the output member of the planetary gear device 174.

In the first ultrasonic motor 170 which is more remote from the planetary gear device 174 than the second ultrasonic motor 172, the stator 110 is fixed to the piece 78b of the motor housing 78. The rotor 112 is fixed to the cylindrical member 176 for rotation therewith. In this arrangement, a rotary motion of the rotor 112 causes a rotary motion of the cylindrical member 176, and a rotary motion of the sun gear 44. The pressing member 114 is interposed between the rotor 112 and a stop member (e.g., E-ring) fixed to the cylindrical member 176. Thus, the rotor 112 of the first ultrasonic motor 170 is biased by the pressing member 114, between the piece 78b of the motor housing 78 and the stop member 180.

In the second ultrasonic motor 172 which is nearer to the planetary gear device 174 than the first ultrasonic motor 170, the stator 110 is fixed to a support portion 182 of the piece 78a of the motor housing 78. The rotor 112 is fixed to the cylindrical member 178 such that the rotor 112 is rotatable with the cylindrical member 178. In this arrangement, a rotary motion o the rotor 112 causes a rotary motion of the cylindrical member 178, and a rotary motion of the carrier 48. The pressing member 114 is interposed between the rotor 112 and a stop member 184 fixed to the cylindrical member 178. Thus, the rotor 112 of the second ultrasonic motor 172 is biased by the pressing member 114, between the support portion 182 and the stop member 184.

The principle of control of the ultrasonic motors 170, 712 will be first explained by reference to the table of FIG. 8.

When the disc brake 168 is required to increase the actual braking force for the corresponding wheel, the first ultrasonic motor 170 whose rotor 112 is connected to the sun gear 44 is operated in the reverse direction while the second ultrasonic motor 172 whose rotor 112 is connected to the carrier 48 is operated in the forward direction, if the desired braking force F* to be achieved is not larger than the threshold value $f_n$. If the desired braking force F* is larger than the threshold $f_n$, however, only the first ultrasonic motor 170 is operated in the reverse direction while the second ultrasonic motor 172 is held in the OFF state.

When the disc brake 168 is required to maintain the present braking force for the corresponding wheel, the two ultrasonic motors 170, 172 are both held in the OFF state.

When the disc brake 168 is required to reduce the actual braking force for the corresponding wheel, the first ultrasonic motor 170 whose rotor 112 is connected to the sun gear 44 is operated in the forward direction while the second ultrasonic motor 172 whose rotor 112 is connected to the carrier 48 is operated in the reverse direction, if it is required to rapidly reduce the braking force. If it is required to slowly reduce the braking force, however, only the first ultrasonic motor 170 is operated in the forward direction while the second ultrasonic motor 172 is held in the OFF state.

Figure 9:
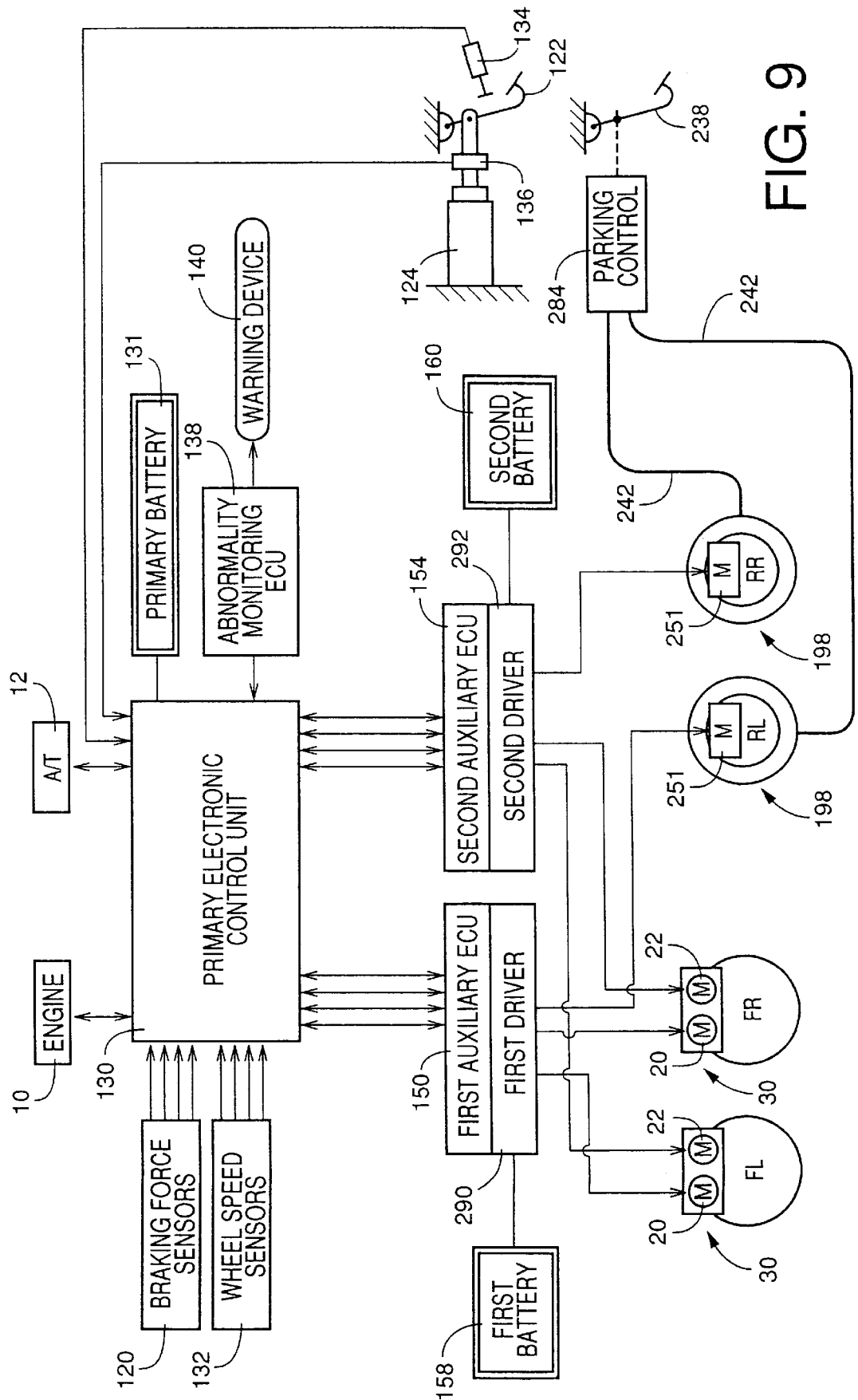
FIG. 9 is a schematic view showing a general arrangement of an electrically operated braking system including electrically operated front wheel disc brakes and rear wheel drum brakes, according to a third embodiment of the present invention.
Figure 10:
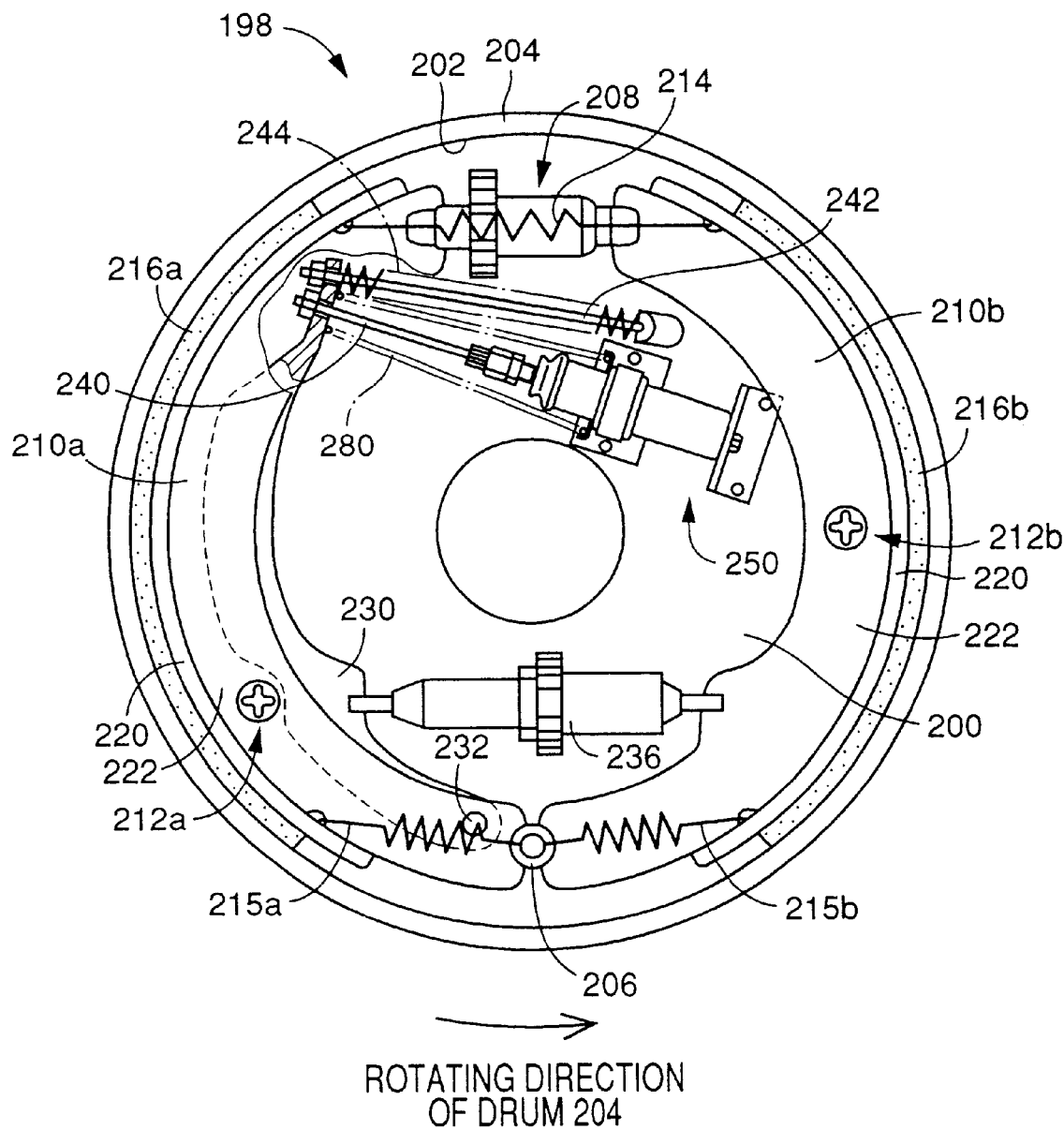
FIG. 10 is a side elevational view partly in cross section of one of the rear wheel drum brakes in the braking system of FIG. 9.
Figure 11:
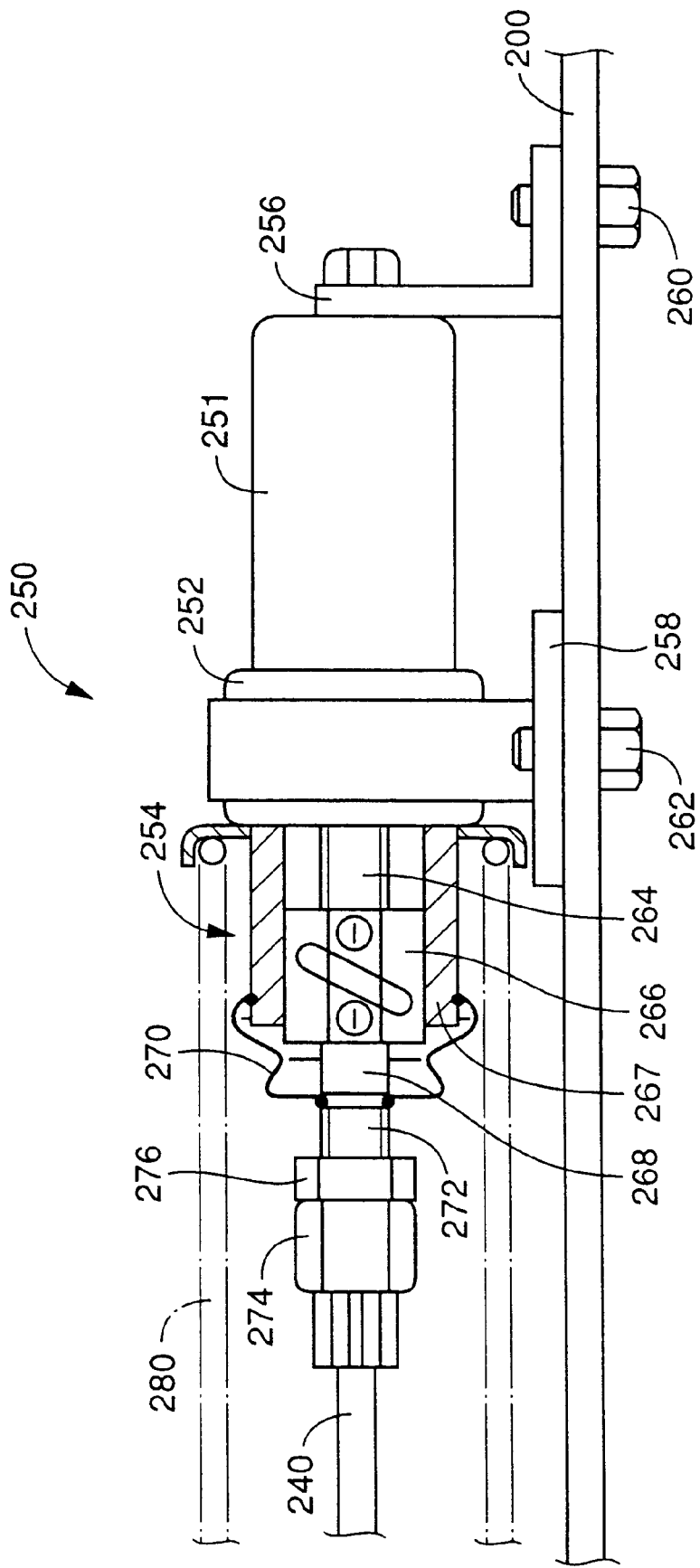
FIG. 11 is a side elevational view partly in cross section of a shoe expanding actuator incorporated in the drum brake of FIG. 10.

Referring to FIGS. 9–11, there will be described a third embodiment of the present invention, which is different from the first embodiment only in that drum brakes 198 rather than the disc brakes 30 are used for the rear wheels RL, RR. The same reference numerals as used in the first embodiment will be used in this third embodiment, to identify the corresponding elements, and only the drum brakes 198 and the related aspect of the braking system will be described.

In the present embodiment, each of the rear wheels RL, RR is provided with an electrically operated drum brake 198 each incorporating an electric motor 251, as generally indicated in FIG. 9.

As shown in detail in FIG. 10, the drum brake 198 includes a stationary member in the form of a substantially circular backing plate 200 fixed to the vehicle body, and a drum 204 which has an inner circumferential friction surface 202 and which rotates with the rear wheel RL, RR. The backing plate 200 has an anchor member in the form of an anchor pin 206 fixed to a relatively radially outer portion thereof at a given circumferential position thereof. At another circumferential position of the backing plate 200 which is diametrically opposite to the circumferential position at which the anchor pin 206 is fixed, there is disposed a connecting link in the form of an adjuster 208 of a floating type not directly fixed to the backing plate 200. A pair of friction members in the form of a pair of brake shoes 210a, 210b are disposed between and so as to connect the anchor pin 206 and the adjuster 208, such that the brake shoes 210a, 210b face the inner friction surface 202 of the drum 204. Each of the brake shoes 210a, 210b has an arcuate shape. The brake shoes 210a, 210b are fixed by respective hold-down devices 212a, 212b to the backing plate 200 such that the brake shoes 210a, 210b are movable in a plane parallel to the backing plate 200. The backing plate 200 has a central opening through which a rear axle shaft extends so as to be rotatable.

Each of the brake shoes 210a, 210b is operatively connected at one end thereof to the corresponding end portion of the adjustor 208, and is held at the other end in abutting contact with the anchor pin 206, so that the shoe 210a, 210b is pivotable about the anchor pin 206. An adjuster spring 214 is connected to the end portions of the brake shoes 210a, 210b operatively connected to the adjuster 208, so that the end portions are biased by the adjuster spring 214 toward each other. Return springs 215a, 215b are connected to the other end portions of the brake shoes 210a, 210b, respectively, so that these end portions are biased by the return spring 215a, 215b toward the anchor pin 206. The arcuate brake shoes 210a, 210b have respective arcuate brake linings 216a, 216b held at their outer surfaces such that the brake linings 216a, 216b face the inner circumferential friction surface 202 of the drum 204. With frictional contact of these brake linings 216a, 216b with the inner circumferential friction surface 202, there arise friction forces between the brake linings 216a, 216b and the drum 204.

Each brake shoe 210a, 210b consists of a rim 220 and a web 222. A lever 230 is pivotably connected at one end thereof to a lever support member in the form of a pin 232 fixed to the web 222 of the brake shoe 210a. The lever 230 and the web 222 of the other brake shoe 210b have respective cutouts which engage respective opposite ends of a strut 236 which serves as a power transmitting member. The strut 236 has a screw mechanism which can be manually operated to adjust the length of the strut 236.

The present electrically operated drum brake 198 is activated by pivotal movement of the lever 230 about the pin 232 at its one end when a parking brake operating member in the form of a parking brake pedal 238 shown in FIG. 9 is operated, as well as when the brake pedal 122 is operated. To this end, not only a primary brake cable 240) but also a parking brake cable 242 are connected to the other end of the lever 230, as shown in FIG. 10. A Each of these brake cables 240, 242 consists of a strand of a plurality of wires, and is accordingly flexible. A compression coil spring 244 is connected at its one end to the above-indicated other end of the lever 230 and at the other end to the backing plate 200, as in the conventional hydraulically operated braking system. The spring 244 extends coaxially with the parking brake cable 242.

The primary brake cable 240 is connected to a shoe expanding actuator 250 attached to the backing plate 200. As shown in enlargement in FIG. 11, the shoe expanding actuator 250 includes the electric motor 251, a speed reducer 252 whose input shaft is connected to the output shaft of the electric motor 251, and a motion converting mechanism in the form of a ballscrew mechanism 254 whose input member is connected to an output shaft of the speed reducer 252. The end of the primary brake cable 240 remote from the lever 230 is connected to an output member of the ballscrew mechanism 254. The electric motor 251 may be a ultrasonic motor constructed similarly to the ultrasonic motor 20, 22 used in the disc brake 30, or any other type of motor such as a DC motor. A rotary motion of the electric motor 251 is converted by the ballscrew mechanism 254 into a linear movement of the primary brake cable 240. In FIG. 11, reference numerals 256 and 258 denote brackets, while reference numerals 260, 262 denote mounting screws for mounting the brackets 256, 258 to the backing plate 200.

The ballscrew mechanism 254 includes an externally threaded member 264 serving as the input member, a nut 266 serving as the output member, and a plurality of balls through which the externally threaded member 264 and the nut 266 engage each other. The nut 266 engages a stationary housing 267 such that the nut 266 is not rotatable and is axially movable relative to the housing 267. A rotary motion of the externally threaded member 264 is converted into a linear or axial motion of the nut 266. The nut 266 has an output shaft 268 fixed to its one end remote from the externally threaded member 264, such that the output shaft 268 is coaxial with the nut 266. The externally threaded member 264, nut 266 and output shaft 268 are protected against exposure of their engaging portions to dust or other foreign matters, by the housing 267 and an elastic dust boot 270.

The primary brake cable 240 is connected to the output shaft 268 through a cable fixing screw in the form of an externally threaded member 272 and a cable fixing nut 274. The externally threaded member 272 is formed so as to extend from the end of the output shaft 268 remote from the ballscrew mechanism 254, while the nut 274 engages the externally threaded member 272 and is connected to the primary brake cable 240. A lock nut 276 is screwed on the externally threaded member 272 such that the lock nut 276 is forced against the cable fixing nut 274, so as to lock the nut 274, namely, so as to prevent loosening of the nut 274.

The shoe expanding actuator 250 constructed as described above is operated in one direction to pull the primary brake cable 240 upon operation of the brake pedal 122, so that the lever 230 is pivoted about the pin 232 such that the end portion of the lever 230 to which the primary brake cable 240 is connected is moved toward the brake shoe 210b. As a result, the two brake shoes 210a, 210b are moved away from each other other.

After the shoe expanding actuator 250 is operated in the reverse direction and returned to its initial non-operated position, the brake shoes 210a, 210b are moved toward each other by a shoe contracting mechanism in the form of a primary brake return spring 280, against a self-servo effect. The primary brake return spring 280 is a compression coil spring which is connected at its one end to the lever 230 and at the other end to a stationary portion (e.g., housing or bracket) of the actuator 250. The compression coil spring 280 is disposed coaxially with the primary brake cable 240. Upon releasing of the brake pedal 122, the actuator 250 is returned to its initial position, and the lever 230 is pivoted to be returned to its initial non-operated position under the biasing force of the primary brake return spring 280.

As shown in FIG. 9, the parking brake cable 242 is connected, at its end remote from the lever 230, to a parking control 284, which is mechanically operated by the parking brake pedal 238 so as to pull the parking brake cable 242 for pivoting the lever 230 in the shoe expanding direction for moving the two brake shoes 210a, 210b away from each other.

When the brake pedal 122 is operated, the shoe expanding actuator 250 is operated to pull the primary brake cable 240 for pivoting the lever 230 in the above-indicated shoe expanding direction, as shown in FIG. 10. In this case, the parking brake cable 242 becomes slack. When the parking brake pedal 238 is operated, the parking control 284 is operated to pull the parking brake cable 242 for pivoting the lever 230 also in the shoe expanding direction. In this case, the primary brake cable 240 becomes slack. Since the two brake cables 240, 242 which are both connected to the lever 230 and pulled at different times are flexible, the operation of one of these brake cables is not influenced or disturbed by the other brake cable.

It will be understood from the above explanation of the present third embodiment that each of the drum brakes 198 for the rear left and right wheels RL, RR uses only one electric motor 251, contrary to the disc brake 30 used for each rear wheel RL, RR in the first embodiment. The third embodiment is further different from the first embodiment in that a first driver 290 connected to the first battery 158 is connected to the electric motor 251 of the drum brake 198 for the rear left wheel RL and the first ultrasonic motors 20 of the disc brakes 30 for the front left and right wheels FL, FR, while a second driver 292 connected to the second battery 160 is connected to the electric motor 251 of the drum brake 198 for the rear right wheel RR and the second ultrasonic motors 22 of the disc brakes 30 for the front left and right wheels FL, FR.

Figure 12:
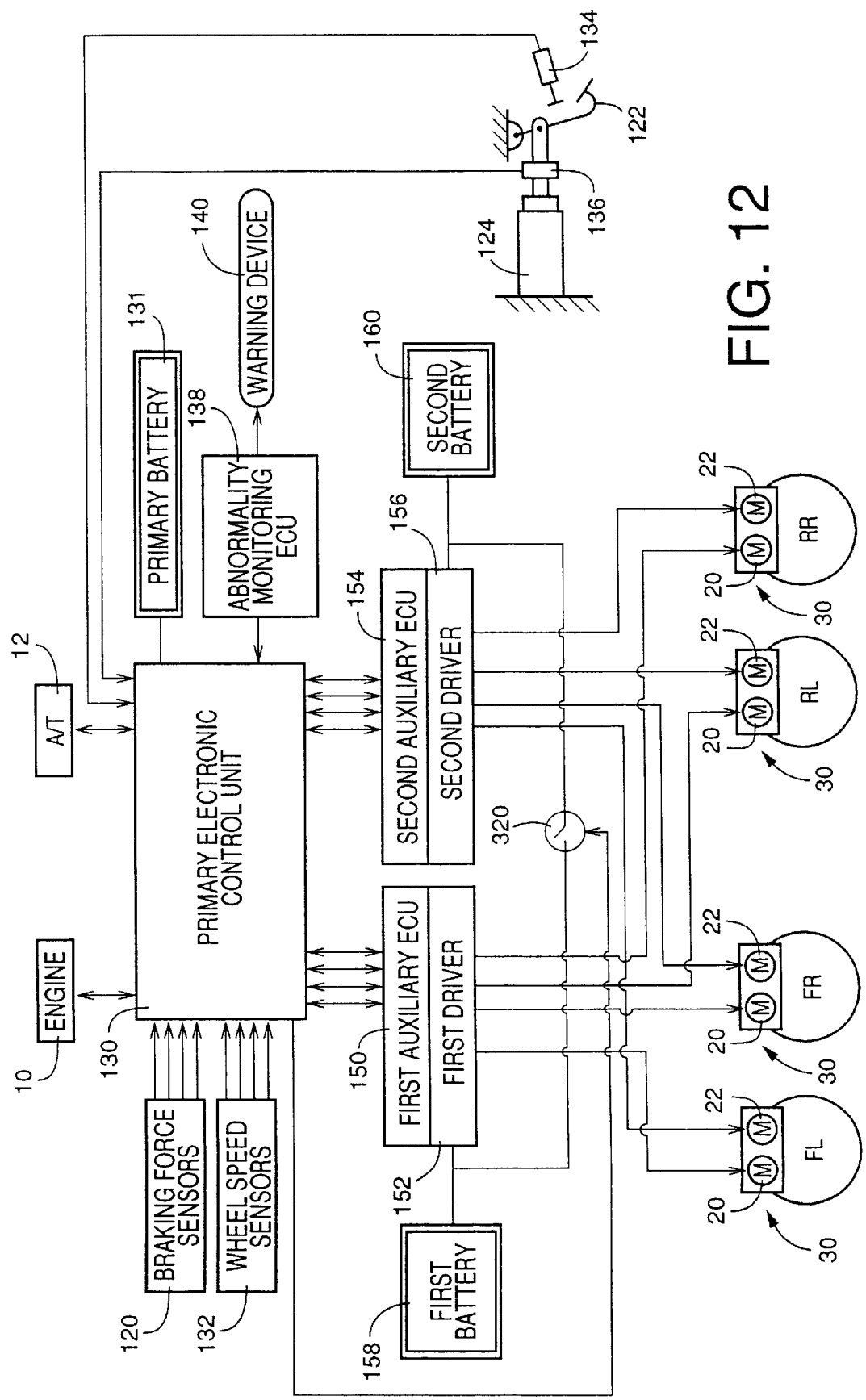
FIG. 12 is a schematic view showing a general arrangement of an electrically operated braking system including electrically operated disc brakes, according to a fourth embodiment of this invention.

A fourth embodiment of the present invention will then be described by reference to FIGS. 12 and 13. This fourth embodiment is different from the first embodiment only in the provision of a battery connecting switch 320 connected to the first and second auxiliary batteries 158, 160. The same reference numerals as used in the first embodiment will be used in the fourth embodiment to identify the corresponding elements, and only the battery connecting switch 320 and the related aspect of the braking system will be described.

The battery connecting switch 320 has a connecting state for connecting the first and second auxiliary batteries 158, 160 through a relay, and a disconnecting state for disconnecting the two auxiliary batteries 158, 160. The battery connecting switch 320 is normally placed in the disconnecting state, and is brought to the connecting state as needed, in response to a control signal received from the primary electronic control unit 130. The ROM of the primary electronic control unit 130 stores a control program for executing a routine illustrated in the flow chart of FIG. 13, for controlling the battery connecting switch 320.

Figure 13:
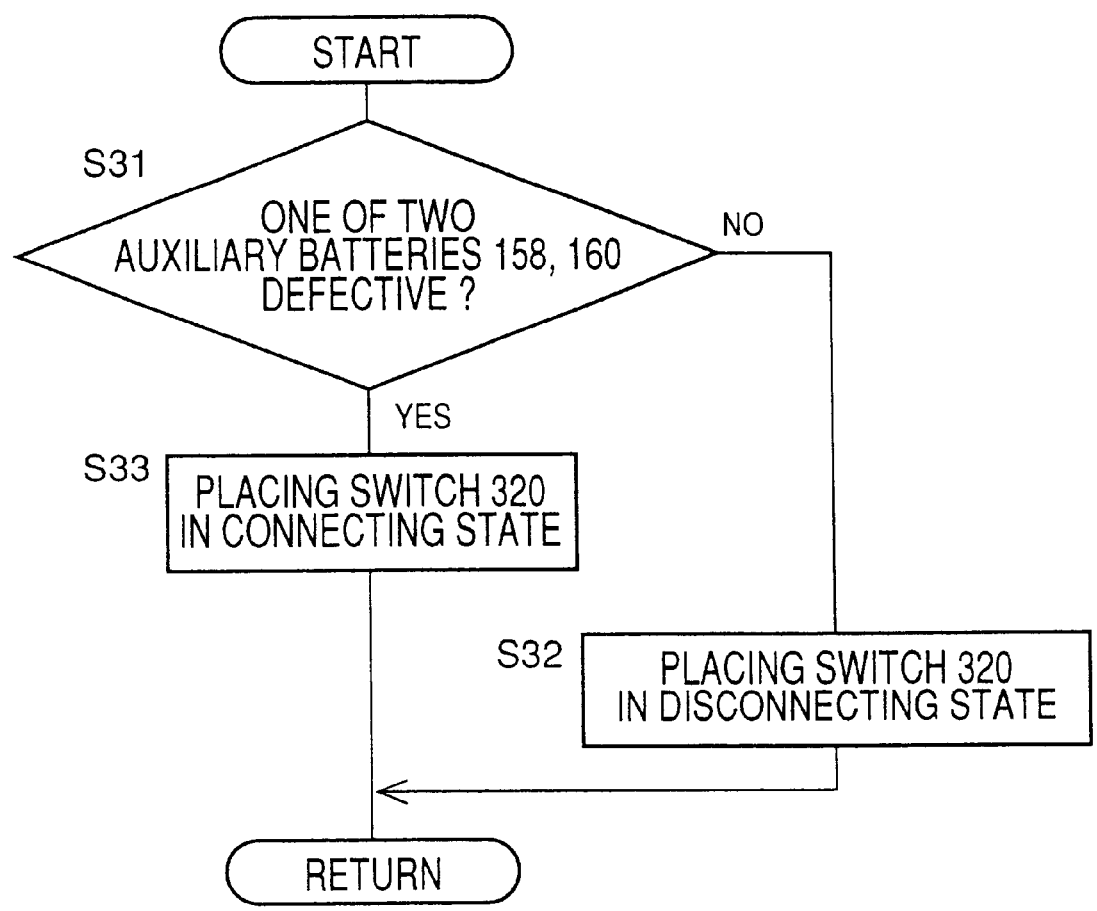
FIG. 13 is a flow chart illustrating a routine for controlling a battery connecting switch, according to a control program stored in a ROM of a computer of a primary electronic control unit in the braking system of FIG. 12.

The routine of FIG. 13 is also repeatedly executed. Each cycle of execution of the routine is initiated with step S31 to determine whether one of the two auxiliary batteries 158, 160 is defective, for example, whether the voltage of one of the two auxiliary batteries 158, 160 is lower than a predetermined lower limit. If a negative decision (NO) is obtained in step S31, that is, if the two auxiliary batteries 158, 160 are both normal, the control flow goes to step S32 in which the primary electronic control unit 130 commands the battery connecting switch 320 to be held in the disconnecting state. Thus, one cycle of execution of the routine is terminated. If either one of the two auxiliary batteries 158, 160 is found defective, that is, if an affirmative decision (YES) is obtained in step S31, the control flow goes to step S33 in which the primary electronic control unit 130 commands the battery connecting switch 130 to be brought to the connecting state. Thus, one cycle of execution of the routine is terminated.

If the two auxiliary batteries 158, 160 were not connected to each other while one of these batteries is defective, only the two ultrasonic motors 20, 22 of each disc brake 30 which is normal would be operated. In the present fourth embodiment, however, the two batteries 158, 160 are connected to each other by the battery connecting switch 320 while one of these two batteries is defective, so that both of the two ultrasonic motors 20, 22 of each disc brake 30 are operated by an electric energy supplied thereto from the normally functioning battery 158, 160. Accordingly, the disc brake 30 is capable of producing a sufficiently large braking force even in the even of failure of one of the two auxiliary batteries 158, 160.

While the several presently preferred embodiments of this invention have been described above in detail by reference to the accompanying drawings, it is to be understood that the invention is not limited to the details of the illustrated embodiments, but may be embodied with various changes, modifications and improvements, which may occur to those skilled in the art, without departing from the spirit and scope of the following claims:

What is claimed is:

1. An electrically operated brake for braking a moving body with a friction force, comprising:
    a friction member for braking the moving body;
    two electric motors;
    a planetary gear device including a sun gear, a plurality of planetary gears meshing with said sun gear, a carrier rotatably supporting said at least one planetary gear, and a ring gear meshing with said at least one planetary gear, said two electric motors being connected to respective two members selected from among three members consisting of said sun gear, said carrier and said ring gear;
    an output shaft connected to and rotated by one of said three members other than said two members; and
    a friction member driving device operable by rotation of said output shaft, to move said friction member.

2. An electrically operated brake according to claim 1, wherein both of said two electric motors are ultrasonic motors.

3. An electrically operated brake according to claim 1, wherein said two electric motors and said planetary gear device are disposed coaxially with said output shaft.

4. An electrically operated brake according to claim 3, wherein said planetary gear device is disposed between said two electric motors.

5. An electrically operated brake according to claim 1, wherein said two electric motors are connected to said sun gear and said ring gear, respectively, while said output shaft is connected to said carrier.

6. An electrically operated brake according to claim 1, wherein said two electric motors are connected to said sun gear and said carrier, respectively, while said output shaft is connected to said ring gear.

7. An electrically operated brake according to claim 1, wherein said two electric motors are connected to said ring gear and said carrier, respectively, while said output shaft is connected to said sun gear.

8. An electrically operated brake according to claim 1, wherein said output shaft has a hole formed so as to extend in an axial direction thereof and open in at least one of opposite end faces thereof, and said friction member driving device includes (a) an output rod which is at least partially inserted in said hole of said output shaft, so as to be axially movable relative to said output shaft, said output rod being engageable with said friction member, and (b) a motion converting mechanism for converting a rotary motion of said output shaft into a linear motion of said output rod, and wherein said two electric motors and said planetary gear device are disposed coaxially with each other, and said output shaft extends through and coaxially with said two electric motors and said planetary gear device.

9. An electrically operated brake according to claim 1, wherein said moving body is a vehicle having a wheel, said electrically operated brake further comprising a rotor rotating with said wheel, and wherein said friction member is forced against a surface of said rotor to restrict rotation of said rotor.

10. An electrically operated braking system comprising:
    a brake operating member;
    a brake operating amount sensor for detecting an amount of operation of said brake operating member;
    an electrically operated brake for braking a moving body with a friction force, including:
        a friction member for braking the moving body;
        two electric motors;
        a planetary gear device including a sun gear, a plurality of planetary gears meshing with said sun gear, a carrier rotatable supporting said at least one planetary gear, and a ring gear meshing with said at least one planetary gear, said two electric motors being connected to respective two members selected from among three members consisting of said sun gear, said carrier and said ring gear;
        an output shaft connected to and rotated by one of said three members other than said two members; and
        a friction member driving device operable by rotation of said output shaft, to move said friction member;
    an electric power source device for supplying power to said two electric motors; and
    a motor control device for controlling an amount of power to be supplied from said electric power source device to each of said two electric motors, in response to a signal received from said brake operating amount sensor.

11. An electrically operated braking system according to claim 10, wherein said two electric motors of said electrically operated brake are two ultrasonic motors, and said two electric motors are connected to said sun gear and said ring gear, respectively, while said output shaft is connected to said carrier, said motor control device including a ultrasonic motor de-activating device for holding one of said two ultrasonic motors which is connected to said ring gear, in an OFF state thereof, when a braking force for braking said moving body based on said friction force generated by said friction member is required to be increased to a value exceeding a predetermined threshold.

12. An electrically operated braking system according to claim 10, wherein said two electric motors are two ultrasonic motors, and said two ultrasonic motors are connected to said sun gear and said ring gear, respectively, while said output shaft is connected to said carrier.

13. An electrically operated braking system according to claim 12, wherein said motor control device includes a braking force increasing device which is operated when a braking force for braking said moving body based on said friction force generated by said friction member is required to be increased, said braking force increasing device including at least one of means for operating said two ultrasonic motors in a forward direction, and means for operating one of said two ultrasonic motors which is connected to said sun gear, in the forward direction, while holding the other ultrasonic motor connected to said ring gear in an OFF state.

14. An electrically operated braking system according to claim 12, wherein said motor control device includes a braking force selectively increasing device which is operated when a desired value of a braking force for braking said moving body based on said friction force generated by said friction member is required to be increased, said brake force selectively increasing device operating said two ultrasonic motors in a forward direction if said desired value is not larger than a predetermined threshold, and operating one of said two ultrasonic motors which is connected to said sun gear, in the forward direction, while holding the other ultrasonic motor connected to said ring gear in an OFF state, if said desired value is larger than said predetermined threshold.

15. An electrically operated braking system according to claim 12, wherein said motor control device includes a braking force holding device for holding both of said two ultrasonic motors in an OFF state when the braking force for braking said moving body is required to be maintained at a value substantially equal to a presently established value.

16. An electrically operated braking system according to claim 12, wherein said motor control device includes a braking force reducing device which is operated when the braking force for braking said moving body is required to be reduced, said braking force reducing device including at least one of means for operating said two ultrasonic motors in a reverse direction, means for operating one of said two ultrasonic motors which is connected to said sun gear, in the reverse direction while holding the other ultrasonic motor connected to said ring gear in an OFF state, and means for operating said other ultrasonic motor in the reverse direction while holding said one ultrasonic motor in an OFF state.

17. An electrically operated braking system according to claim 12 wherein said motor control device includes a braking force selectively reducing device which is operated when the braking force for braking said moving body is required to be reduced, said braking force selectively reducing device operating said two ultrasonic motors in a reverse direction if a required rate of reduction of said braking force is not lower than a predetermined threshold, and operating one of said two ultrasonic motors which is connected to said sun gear, in the reverse direction while holding the other ultrasonic motor connected to said ring gear in an OFF state, or alternatively operating said other ultrasonic motor in the reverse direction while holding said one ultrasonic motor in an OFF state, if said required rate of reduction is lower than said predetermined threshold.

18. An electrically operated braking system according to claim 10, wherein said electric power source device includes two separate power sources provided independently of each other for said two electric motors, respectively.

19. An electrically operated braking system according to claim 18, wherein said moving body is a vehicle having a plurality of wheels, and said electrically operated brake is provided for each of said plurality of wheels, and includes said two electric motors as a first motor and a second motor, and wherein said two separate power sources are provided as a first power source and a second power source for the electrically operated brakes for all of said plurality of wheel of the vehicle, said first power source supplying power to the first motors of all of said electrically operated brakes, while said second power source supplying power to the second motors of all of said electrically operated brakes.

20. An electrically operated braking system according to claim 19, wherein said plurality of wheels include at least one front wheel and at least one rear wheel.

* * * * *